(12) United States Patent
Walker et al.

(10) Patent No.: US 11,842,379 B2
(45) Date of Patent: Dec. 12, 2023

(54) METHOD AND SYSTEM FOR OBTAINING ITEM-BASED RECOMMENDATIONS

(71) Applicant: SAS Institute Inc., Cary, NC (US)

(72) Inventors: Jonathan Lee Walker, Raleigh, NC (US); Hardi Desai, Raleigh, NC (US); Xuejun Liao, Cary, NC (US); Varunraj Valsaraj, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 18/169,592

(22) Filed: Feb. 15, 2023

(65) Prior Publication Data
US 2023/0267527 A1    Aug. 24, 2023

Related U.S. Application Data

(60) Provisional application No. 63/332,187, filed on Apr. 18, 2022, provisional application No. 63/311,904, filed on Feb. 18, 2022.

(51) Int. Cl.
  *G06Q 30/00*    (2023.01)
  *G06Q 30/0601*  (2023.01)
  *G06N 5/04*     (2023.01)

(52) U.S. Cl.
  CPC ........... *G06Q 30/0631* (2013.01); *G06N 5/04* (2013.01)

(58) Field of Classification Search
  CPC .......................... G06Q 30/06–08; G06N 5/04
  See application file for complete search history.

(56) References Cited

U.S. PATENT DOCUMENTS

| | | |
|---|---|---|
| 7,908,183 B2 | 3/2011 | Jacobi et al. |
| 8,484,099 B1 | 7/2013 | Pope et al. |
| 8,996,540 B2 | 3/2015 | Torrens et al. |
| 9,477,713 B2 | 10/2016 | Alvino et al. |
| 9,613,118 B2 | 4/2017 | Whitman |

(Continued)

FOREIGN PATENT DOCUMENTS

WO    0208991 A1    1/2002

OTHER PUBLICATIONS

Chiang, J., "7 Types of Hybrid Recommendation System", Analytics Vidhya, Jun. 26, 2021, pp. 1-19.

(Continued)

*Primary Examiner* — Ethan D Civan
(74) *Attorney, Agent, or Firm* — The Law Office of Tiffany E. Monroe, LLC; Tiffany E. Monroe

(57) ABSTRACT

The computing device obtains a training data set related to a plurality of historic user inputs associated with preferences of one or more services or items from an entity. For each of the one or more services or items, the computing device executes operations to train a plurality of models using the training data set to generate a plurality of recommended models, apply a validation data set to generate a plurality of predictions from the plurality of recommended models, obtain a weight of each metric of a plurality of metrics from the entity, obtain user inputs associated with user preferences, and determine a relevancy score for each metric. The computing device selects a recommended model based on the relevancy score of the selected metric or a combination of selected metrics, generates one or more recommendations for the users, and outputs the one or more generated recommendations to the users.

30 Claims, 16 Drawing Sheets

(56) References Cited

U.S. PATENT DOCUMENTS

| | | | |
|---|---|---|---|
| 11,379,743 | B2 | 7/2022 | Liao et al. |
| 11,544,767 | B2 | 1/2023 | Liao et al. |
| 11,657,355 | B2 | 5/2023 | Brini et al. |
| 11,659,247 | B2 * | 5/2023 | Srinivasaraghavan ............ H04N 21/84 725/34 |
| 11,706,268 | B2 | 7/2023 | Sundaresan et al. |
| 11,709,586 | B2 | 7/2023 | Wilde et al. |
| 2019/0258904 | A1 * | 8/2019 | Ma ............... G06F 18/24133 |
| 2020/0301963 | A1 | 9/2020 | Asman |
| 2021/0233147 | A1 * | 7/2021 | Berl ............... G06Q 30/0631 |
| 2022/0067573 | A1 * | 3/2022 | Munguia Tapia .. G06F 11/3495 |
| 2022/0138605 | A1 | 5/2022 | Liao et al. |

OTHER PUBLICATIONS

Li et al., "A hybrid collaborative filtering method for multiple-interests and multiple-content recommendation in E-Commerce", Expert Systems with Applications, 2005, pp. 67-77, Elsevier Ltd.

Cantador et al., "Cross-Domain Recommender Systems", Recommender Systems Handbook, 2015, pp. 919-959, Springer, New York, United States.

Cremonesi et al., "Cross-domain recommender systems", IEEE Computer Society, 2011, pp. 496-503, IEEE.

Dooms, S., "Dynamic Generation of Personalized Hybrid Recommender Systems", RecSys '13: Seventh ACM Conference on Recommender Systems, Oct. 12, 2013, pp. 443-446, Association for Computing Machinery, New York, United States.

Aggarwal, C., "Ensemble-Based and Hybrid Recommender Systems", Recommender Systems: The Textbook, 2016, pp. 199-224, Springer International Publishing, Switzerland.

Parton et al., "Mixtures of Heterogeneous Experts", ISMSI '20: 2020 4th International Conference on Intelligent Systems, May 30, 2020, pp. 1-7, Association for Computing Machinery, New York, United States.

Adomavicius et al., "Multidimensional Recommender Systems: A Data Warehousing Approach", Electronic Commerce—2nd International Workshop, WELCOM 2001, Proceedings, 2001, pp. 180-192, Springer Verlag, Heidelberg, Germany.

Wei et al., "Recommender Systems: A Market-Based Design", The Second International Joint Conference on Automonous Agents and Multi-Agent Systems (AAMAS'03), Jul. 14, 2003, pp. 600-607, Association for Computing Machinery, New York, United States.

Abdollahpouri et al., "Recommender Systems as Multistakeholder Environments", UMAP '17: Proceedings of the 25th Conference on User Modeling, Adaptation and Personalization, Jul. 9, 2017, pp. 347-360, Association for Computing Machinery, New York, United States.

Thomas et al., "The Design of Web Based Car Recommendation System using Hybrid Recommender Algorithm", International Journal of Engineering & Technology, Jun. 25, 2018, pp. 192-196, vol. 7—No. 3.4, Science Publication Corporation.

Cantador et al., "Tutorial on Cross-domain Recommender Systems", RecSys'14: Eighth ACM Conference on Recommender Systems, Oct. 6, 2014, pp. 401-402, Association for Computing Machinery, New York, United States.

\* cited by examiner

| | User Name | Industry | Fleet Size | Region | Model | Type | Trim | Group A Service 1? (Yes=1) (No=0) | Group B Service 1? (Yes=1) (No=0) | Group N Service 1? (Yes=1) (No=0) | Group A Service 2? (Yes=1) (No=0) | Group B Service 2? (Yes=1) (No=0) | Group N Service 2? (Yes=1) (No=0) | Group A Service N? (Yes=0) | Group B Service N? (Yes=1) (No=0) | Group N Service N? (Yes=1) (No=0) |
|---|---|---|---|---|---|---|---|---|---|---|---|---|---|---|---|---|
| Training Data Set | User 1 | Construction | Medium | NC | Model 1 | Truck | 4-door | 1 | 0 | 0 | 0 | 1 | 1 | 1 | 0 | ... 1 |
| | User 2 | Rental Cars | Large | MI | Model 2 | SUV | SE | 0 | 1 | 1 | 1 | 0 | 0 | 1 | 0 | ... 1 |
| Validation Data Set | User 3 | Telecom | Medium | WV | Model 3 | Car | LE | 1 | 0 | 1 | 0 | 1 | 1 | 0 | 1 | ... 1 |
| | User 4 | R&D | Large | SC | Model 4 | SUV | LE | 0 | 1 | 0 | 1 | 0 | 0 | 1 | 0 | ... 1 |
| Test Data Set | User N | Delivery | Medium | IL | Model N | Van | XL | 1 | 0 | 1 | 0 | 1 | 1 | 1 | 0 | ... 1 |

FIG. 11

| | Model 1 | | | Model 2 | | | Model 3 | | | Model 4 | | |
|---|---|---|---|---|---|---|---|---|---|---|---|---|
| | Group A | Group B | Group C | Group A | Group B | Group C | Group A | Group B | Group C | Group A | Group B | Group C |
| Precision@1 | 0.9367 | 0.7727 | 0.5229 | 0.9442 | 0.76 | 0.5888 | 0.939 | 0.8588 | 0.861 | 0.9437 | 0.7636 | 0.5532 |
| Recall@1 | 0.9282 | 0.6687 | 0.3043 | 0.9345 | 0.6898 | 0.3252 | 0.9294 | 0.7840 | 0.3224 | 0.9351 | 0.6928 | 0.3222 |
| F1@1 | 0.9322 | 0.7012 | 0.3846 | 0.9388 | 0.7231 | 0.4111 | 0.9341 | 0.8 | 0.4677 | 0.9391 | 0.7260 | 0.4077 |
| Coverage | 1 | 1 | 0.6708 | 1 | 0.9167 | 0.6951 | 0.6667 | 0.3333 | 0.1975 | 0.6667 | 0.3333 | 0.2824 |
| Novelty | 0.0923 | 0.5681 | 0.8128 | 0.0829 | 0.5555 | 0.8113 | 0.0859 | 0.5438 | 0.7803 | 0.0876 | 0.5535 | 0.7931 |

FIG. 12

| User | Model | Recommendation | Relevance |
|---|---|---|---|
| User 1 | Model 1 | Extended Service Plan | 70 |
| User 1 | Model 1 | Telematics Vehicle Location | 50 |
| User 1 | Model 1 | Data Command & Control Services | 40 |
| User 2 | Model 2 | Telematics Vehicle Location | 90 |
| User 2 | Model 2 | Extended Service Plan | 60 |
| User 2 | Model 2 | Data Fuel Services | 70 |
| User 3 | Model 3 | Telematics Driver Score | 20 |
| User 3 | Model 3 | Data Fuel Services | 40 |
| User 3 | Model 3 | Telematics Vehicle Location | 80 |
| User 4 | Model 4 | Data Command & Control Services | 90 |
| User 4 | Model 4 | Extended Service Plan | 40 |
| User 4 | Model 4 | Telematics Vehicle Location | 70 |
| ... | ... | | ... |
| User N | Model N | Telematics Driver Score | 80 |
| User N | Model N | Telematics Vehicle Location | 40 |
| User N | Model N | Data Fuel Services | 30 |

FIG. 13

METHOD AND SYSTEM FOR OBTAINING ITEM-BASED RECOMMENDATIONS

CROSS REFERENCE TO RELATED APPLICATIONS

This application claims the benefit of priority under 35 U.S.C. § 119(e) to U.S. Provisional Patent Application No. 63/311,904 filed on Feb. 18, 2022, and to U.S. Provisional Patent Application No. 63/332,187 filed on Apr. 18, 2022, the entirety of each of which is hereby incorporated by reference herein.

TECHNICAL FIELD

The present disclosure relates to, but not by way of limitation, a method for automatically obtaining item-based recommendations that are most relevant through the automatic training and selection of multiple recommendation systems in a Mixture of Heterogeneous Experts (MoHeE) models.

SUMMARY

In an example embodiment, a system includes a data processor associated with a computing device and a non-transitory computer-readable storage medium. The non-transitory computer-readable storage medium includes instructions that are executable by the data processor for causing the computing device to perform operations. The computing device obtains a training data set related to a plurality of historic user inputs associated with preferences of one or more services or items from an entity. For each of the one or more services or items, the computing device executes operations including: train a plurality of models using the training data set to generate a plurality of recommended models, apply a validation data set including the historic user inputs to generate a plurality of predictions from the plurality of recommended models, obtain a weight of each metric of a plurality of metrics from the entity, obtain user inputs associated with user preferences of the one or more services or items, determine a relevancy score for each metric of the plurality of metrics at least based on the operations of: selecting each metric in the plurality of metrics, applying at least one prediction and at least one user preference to each selected metric, and applying a weight to the selected metric to generate the relevancy score for the selected metric. The weight represents an indication of importance of the metric to the entity. For each of the one or more services or items, the computing device executes operations including: select a recommended model based on the relevancy score of the selected metric or a combination of selected metrics, and generate one or more recommendations for the users from the selected recommended model. The computing device outputs, for each of the one or more services or items, the one or more generated recommendations to the users.

In an exemplary alternative embodiment, the system includes the instructions that are executable by the data processor that further causes the computing device to apply a test data set including the user inputs to the selected recommended model. The system includes the plurality of models. The plurality of models includes supervised machine learning models. The system includes the non-transitory computer-readable storage medium with instructions to obtain the validation data set and the test data set for one or more supervised machine learning models prior to executing the one or more supervised machine learning models.

In another exemplary alternative embodiment, the system includes the training data set, the validation data set, and the test data set. The training data set includes a first set of historic user profiles. The validation data set includes a second set of historic user profiles. The test data set includes a third set of historic user profiles.

In another exemplary alternative embodiment, the system includes the executed operations for each of the one or more services or items that are performed with a unique recommendation system.

In another exemplary alternative embodiment, the system includes the recommendation systems that are operating within a heterogeneous mixture of experts model (MoE) to select an optimal combination of recommendation systems that produce recommendations of the one or more services or items to the users based on an indication of relevancies of the metrics to the entity.

In another exemplary alternative embodiment, the system includes a cloud-based recommendation system to host the MoE and at least one database for the training data set, the validation data set, and the test data set. The cloud-based recommendation system is configured for providing communications to multiple devices for receiving user data and providing the recommendations to the users of the multiple devices.

In another exemplary alternative embodiment, the system includes an event stream processing (ESP) system for executing the operations of the recommendation system.

In another exemplary alternative embodiment, the system includes the selection of the recommended model from the plurality of recommended models that is based on the relevancy score of the selected metric or the combination of selected metrics as derived from an optimization of the selected metric or an optimization of a combination of a plurality of selected metrics.

In another exemplary alternative embodiment, the system includes the selection of the recommended model from the plurality of recommended models that is based on the relevancy score of the selected metric or the combination of selected metrics as derived from a ranking of the weights of the selected metric or the weights of a combination of a plurality of selected metrics.

In another exemplary alternative embodiment, the system includes the user inputs or the historic user inputs that include one or more user preferences of the one or more services or items. The system also includes the one or more services or items that are selected by the entity to display to the users for users to provide to the entity an indication of their one or more user preferences of the one or more services or items.

In another exemplary alternative embodiment, the system includes the one or more services or items related to a user industry, a vehicle fleet size, a user region, a vehicle model, a vehicle type, a dealer network, or a vehicle trim.

In another exemplary alternative embodiment, the system includes the one or more services or items that include network or electrical connectivity services, parts and services, extended warranties, accessories, repair or maintenance plans, or a mechanical part or accessory attached to a vehicle.

In another exemplary alternative embodiment, the system includes the plurality of models that include a random forest, k-nearest neighbors, a matrix factorization, and factorization machines.

In another exemplary alternative embodiment, the system includes the plurality of metrics that includes precision, recall, F1, coverage, or novelty.

In another exemplary alternative embodiment, the system includes the combination of the selected metrics including a weighted combination of the selected metrics that is computed using $$\underset{r \in R}{\operatorname{argmax}} \sum_{i=1}^{n} \omega_i \phi_i(\hat{y}_r),$$

where r represents the selected model from a set of recommendation systems, R represents the set of recommendation systems for a group of one or more services or items, $\omega_i$ represents weights of the corresponding plurality of metrics, $\phi_i$ represents the plurality of metrics, and $\hat{y}_r$ represents the corresponding selected recommendations.

In another exemplary alternative embodiment, a computer-implemented method is provided for obtaining a training data set related to a plurality of historic user inputs associated with preferences of one or more services or items from an entity. For each of the one or more services or items, the computer-implemented method executes operations including: training a plurality of models using the training data set to generate a plurality of recommended models, applying a validation data set including the historic user inputs to generate a plurality of predictions from the plurality of recommended models, obtaining a weight of each metric of a plurality of metrics from the entity, obtaining user inputs associated with user preferences of the one or more services or items, determining a relevancy score for each metric of the plurality of metrics at least based on the operations of: selecting each metric in the plurality of metrics, applying at least one prediction and at least one user preference to each selected metric, and applying a weight to the selected metric to generate the relevancy score for the selected metric. The weight represents an indication of importance of the metric to the entity. For each of the one or more services or items, the computer-implemented method executes operations including: selecting a recommended model based on the relevancy score of the selected metric or a combination of selected metrics, and generating one or more recommendations for the users from the selected recommended model. The computer-implemented method can include outputting, for each of the one or more services or items, the one or more generated recommendations to the users.

BRIEF DESCRIPTION OF THE DRAWINGS

The specification makes reference to the following appended figures, in which use of like reference numerals in different figures is intended to illustrate like or analogous components.

FIG. 11 illustrates an example table of a training data set, validation data set, and test data set, according to certain aspects of the present disclosure.

FIG. 12 is an example table for selecting a mixture of recommended models based on a relevancy score for a selected metric or combination of selected metrics, according to certain aspects of the present disclosure.

FIG. 13 is an example table for outputting generated recommendations to the users for services or items, according to certain aspects of the present disclosure.

DETAILED DESCRIPTION

Figure 1:
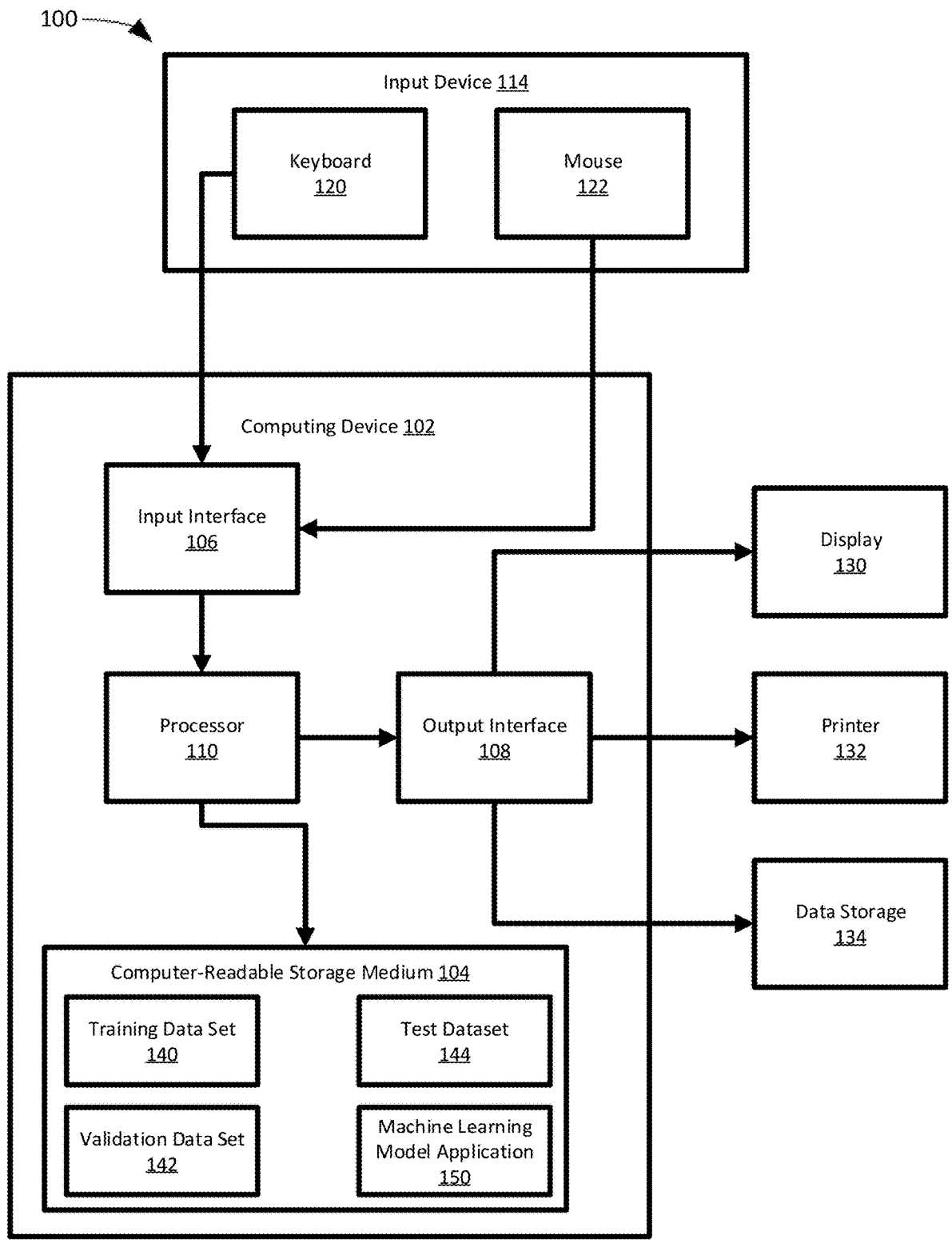
FIG. 1 illustrates an example block diagram of a computer-implemented environment for executing machine learning model application on a training data set, a validation data set, and a test data set, according to certain aspects of the present disclosure.

Recommender systems (RS), also called recommendation engines, belong to a subfield of machine learning in which a goal is to predict one or more items that are relevant for one or more users. Users may include one or more customers that purchase one or more services or items from an entity. For example, users can include police departments, commercial customers, or private customers. The entity may include one or more companies that recommend the one or more services or items to the users. For example, the entity can include motor vehicle companies or manufacturers. Evaluating the performance of any recommender system usually involves the calculation of a plurality of metrics that quantify various aspects of the recommendations. Previous work has explored the recommendation of specific vehicle models to customers. However, the recommendation of additional parts and services congruent with the purchased vehicle is under-explored, especially for fleet or bulk acquisitions and purchases.

Motor vehicle companies routinely offer vehicles with a variety of configurations and a selection of add-on services that may be purchased either at the time of the vehicle purchase or at some point later in the ownership lifecycle. However, selecting the most beneficial vehicle add-on services can be challenging for both the customer and the motor vehicle company. A method for automatically obtaining item-based recommendations for add-on vehicles services that are most relevant to a customer while taking into account the offerings of the manufacturer through the automatic training and selection of multiple recommendation systems in a Mixture of Heterogeneous Experts (MoHeE) models (e.g., a Mixture of Experts (MoE) machine learning modeling system) is needed.

A method for automatically obtaining item-based recommendations for add-on vehicle services that are most relevant to a customer through the automatic training and selection of multiple recommendation systems in the MoHeE models uses different metrics or combinations of different metrics to produce recommendations from items, automatically selects a heterogeneous set of recommendation systems for different items, and optimizes each of the recommendation systems for weighted combinations of different metrics. To develop the MoHeE models, historic user inputs are collected containing the service and/or purchase history for previous customers. The services available are grouped into distinct categories, such as network or electrical connectivity services, parts and services, extended warranties, accessories, repair or maintenance plans, or a mechanical part or accessory attached to a vehicle. Unique recommender systems are trained for each grouping of services using the historic user inputs, yielding one or more potential recommender systems for each group of services. The method then selects the optimal combination of recommender systems to produce the most relevant service recommendations. Each recommender system is evaluated using one or more metrics. For each grouping of services, the recommender system that produces recommendations with the best weighted combination of the desired metrics is automatically selected as the model for that grouping. The entity may select the desired metrics. The best weighted combination of the desired metrics may include metrics selected by the entity with the relevancy score of the selected model that exceeds the relevancy score of the not selected model. Output from each selected recommender system is concatenated together to form the full suite of service recommendations from the system for a given customer.

In many implementations described herein, the customer is a bulk purchaser of many physical items, rather than an individual purchasing a single item. In an example implementation, a company seeks to purchase a fleet of vehicles for various types of drivers depending on their needs and/or roles. In the example implementation of purchasing the fleet of vehicles from an automobile dealer or manufacturer, the company needs to consider the type of transportation required (e.g., car, truck, pickup truck, sports utility vehicle (SUV), etc.), the location of the vehicle (e.g., a particular state with geographic attributes), the size of the fleet purchase, and/or the industry (e.g., construction, rental cars, utilities, government vehicles, delivery services, etc.).

FIG. 1 illustrates an example block diagram of a computer-implemented environment 100 for executing machine learning model application on a training data set, a validation data set, and a test data set, according to certain aspects of the present disclosure. The computer-implemented environment 100 includes a computing device 102.

The computing device 102 has a computer-readable storage medium 104 and a processor 110. Computer-readable storage medium 104 is an electronic holding place or storage for information so the information can be accessed by processor 110. Computer-readable storage medium 104 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 110 executes instructions (e.g., stored at the computer-readable storage medium 104). The instructions can be carried out by a special purpose computer, logic circuits, or hardware circuits. In one or more embodiments, processor 110 is implemented in hardware and/or firmware. Processor 110 executes an instruction, meaning it performs or controls the operations called for by that instruction. The term "execution" is the process of running an application or the carrying out of the operation called for by an instruction. The instructions can be written using one or more programming languages, scripting languages, assembly languages, etc. Processor 110 in one or more embodiments can retrieve a set of instructions from a permanent memory device and copy the instructions in an executable form to a temporary memory device that is generally some form of RAM, for example.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide(GaAs)) devices. Furthermore, these processors may also be employed in heterogeneous computing architectures with a number of and a variety of different types of cores, engines, nodes, and/or layers to achieve various energy efficiencies, thermal mitigation improvements, processing speed improvements, data communication speed improvements, and/or data efficiency targets and improvements throughout various parts of the system when compared to a homogeneous computing architecture that employs CPUs for general purpose computing.

In one or more embodiments, computer-readable storage medium 104 stores instructions for execution by processor 110. For example, the computer-readable storage medium 104 stores a training data set 140, a validation data set 142, a test data set 144, and machine learning model application 150.

In one or more embodiments, the machine learning model application 150 performs operations associated with training a plurality of models using the training data set 140 to generate a plurality of recommended models, applying the validation data set 142 to generate a plurality of predictions from the plurality of recommended models, and applying the test data set 144 to a selected recommended model. The machine learning model application 150 may include utilizing one or more supervised machine learning models including a random forest, k-nearest neighbors, a matrix factorization, and factorization machines, etc.

In one or more embodiments, the training data set 140 may include a first set of historic user profiles. The training data set 140 may be related to a plurality of historic user inputs associated with preferences of one or more services or items from an entity. The training data set 140 may also include a plurality of metrics from the entity for the one or more services or items.

In one or more embodiments, the validation data set 142 is obtained prior to executing the one or more supervised machine learning models. The validation data set 142 may include a second set of historic user profiles.

In one or more embodiments, the test data set 144 may include a third set of historic user profiles.

In one or more embodiments, one or more applications stored on computer-readable storage medium 104 are implemented in software (e.g., computer-readable and/or computer-executable instructions) stored in computer-readable storage medium 104 and accessible by processor 110 for execution of the instructions. The applications can be written using one or more programming languages, assembly languages, scripting languages, etc. The one or more applications can be integrated with other analytic tools. As an example, the machine learning model application 150 may be integrated data analytics software applications and/or software architectures such as that offered by SAS Institute Inc. of Cary, N.C., USA. Merely for illustration, the applications are implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, SAS® Visual Forecasting, SAS® Demand Planning, SAS® Visual Text Analytics, SAS® Natural Language Processing, and SAS/IML® all of which are developed and provided by SAS Institute Inc. of Cary, N.C., USA.

One or more applications stored on computer-readable storage medium 104 can be implemented as a Web application. For example, an application can be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

In one or more embodiments, fewer, different, and additional components can be incorporated into computing device 102. For instance, in one or more embodiments, computing device 102 further includes an input interface 106. Processor 110 operably couples with components of computing device 102 (e.g., input interface 106, with output interface 108 and with computer-readable storage medium 104) to receive, to send, and to process information.

In one or more embodiments, the computing device 102 receives information from input device 114 via input interface 106. In one or more embodiments, the input device 114 is one or more devices for user entry (e.g., execute operations for each of the one or more services or items) into the computer-implemented environment 100. For instance, the input device 114 could include one or more of a mouse 122 or a keyboard 120. Alternatively or additionally, the input device 114 includes a display, a track ball, a keypad, a touchpad, one or more buttons, a sensor, a phone, a user selection mechanism, etc. For instance, a user executes machine learning model application operations on a training data set, a validation data set, and a test data set with the computing device 102 (e.g., using mouse 122 or keyboard 120).

The computing device 102 outputs information to a display 130, printer 132, or data storage 134 via output interface 108. Output interface 108 provides an interface for outputting information (e.g., output, for each of the one or more services or items, the one or more generated recommendations to the users).

Figure 2A:
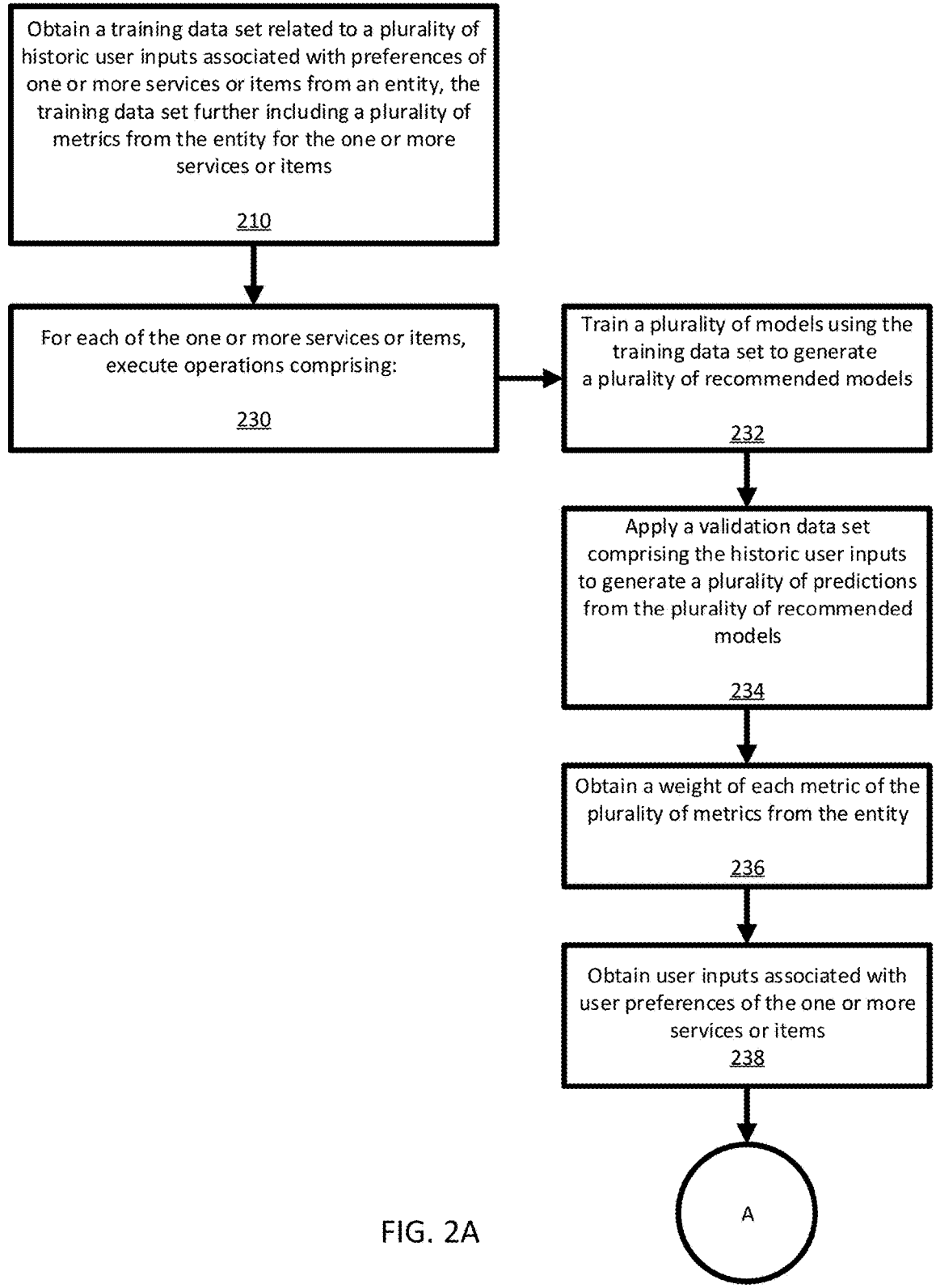
FIGS. 2A, 2B, and 2C illustrate example flow diagrams for executing machine learning model application on a training data set, a validation data set, and a test data set, according to certain aspects of the present disclosure.
Figure 2B:
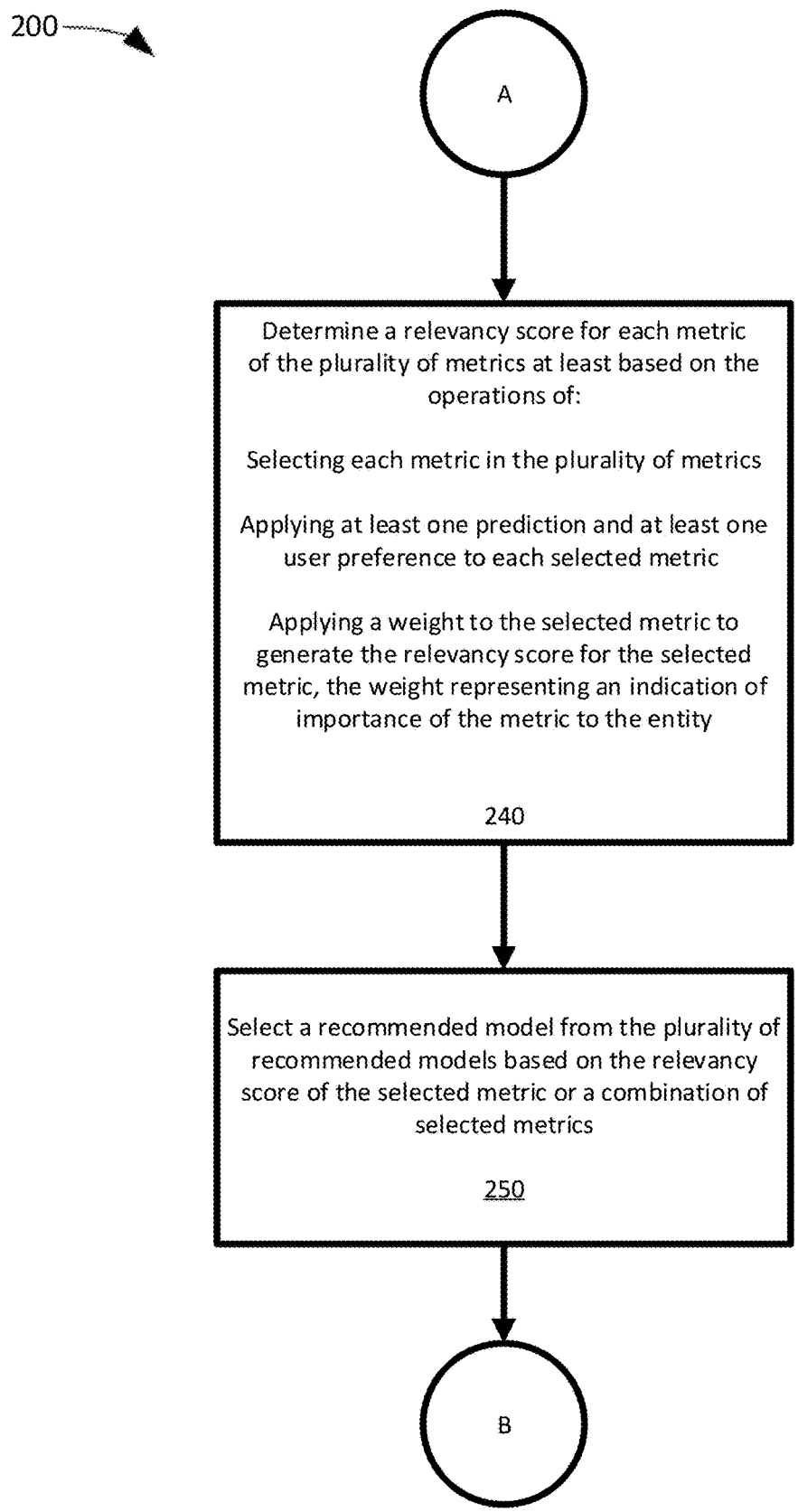
Figure 2C:
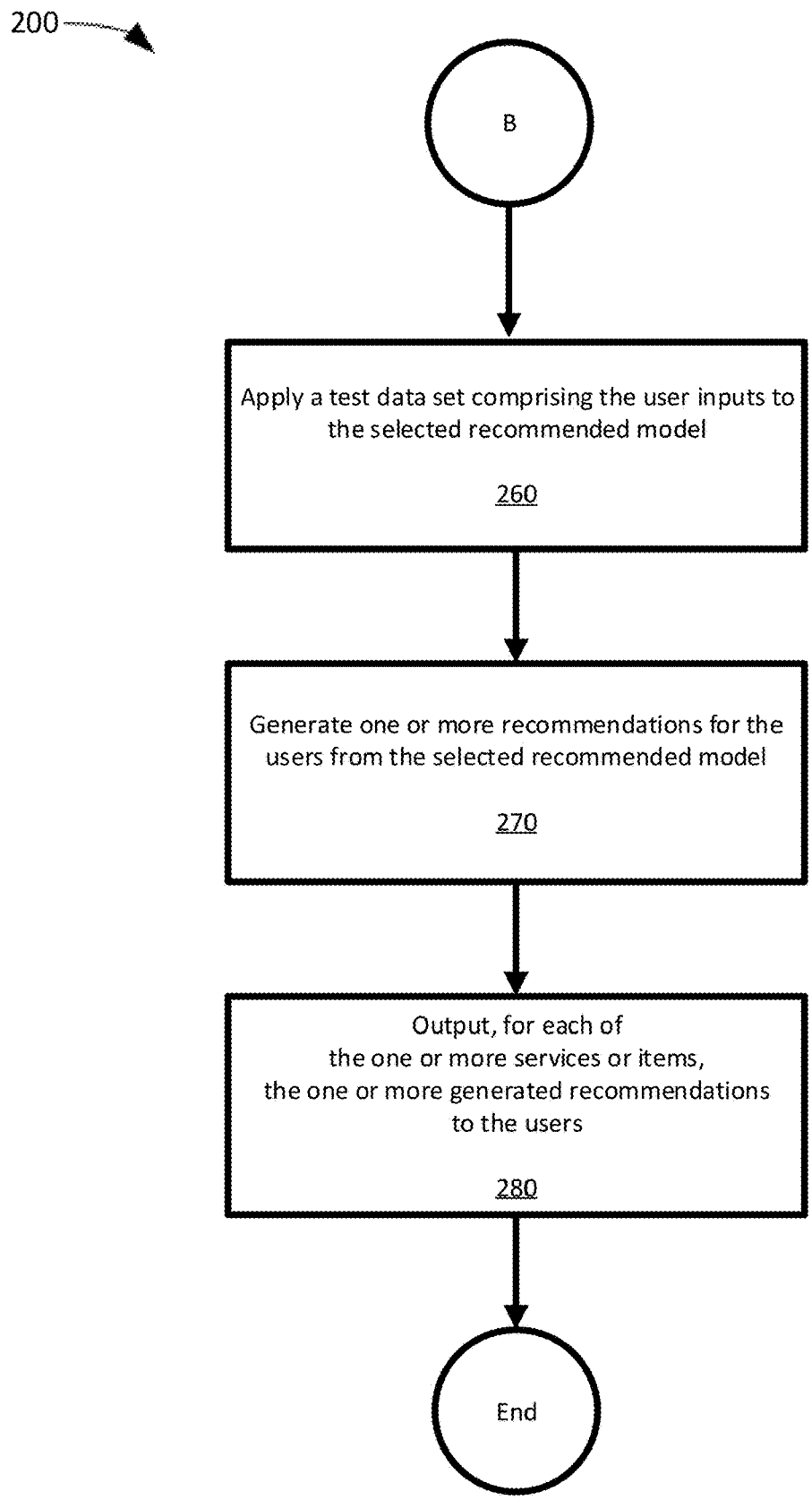

FIGS. 2A, 2B, and 2C illustrate example flow diagrams for executing machine learning model application on a training data set, a validation data set, and a test data set, according to certain aspects of the present disclosure. Prior to executing the one or more supervised machine learning models, the computing device may obtain the validation data set and the test data set for one or more supervised machine learning models. The one or more supervised machine learning models may include a random forest, k-nearest neighbors, a matrix factorization, and factorization machines. The executed operations for each of the one or more services or items are performed with a unique recommendation system. The recommendation systems are operating within a heterogeneous mixture of experts model (MoE) to select an optimal combination of recommendation systems that produce recommendations of the one or more services or items to the users based on an indication of relevancies of the metrics to the entity. The unique recommendation system may include a cloud-based recommendation system to host the MoE and at least one database for the training data set, the validation data set, and the test data set. The cloud-based recommendation system may be configured for providing communications to multiple devices for receiving user data and providing the recommendations to the users of the multiple devices. The unique recommendation system may also include an event stream processing (ESP) system for executing the operations of the recommendation system.

Figure 10:
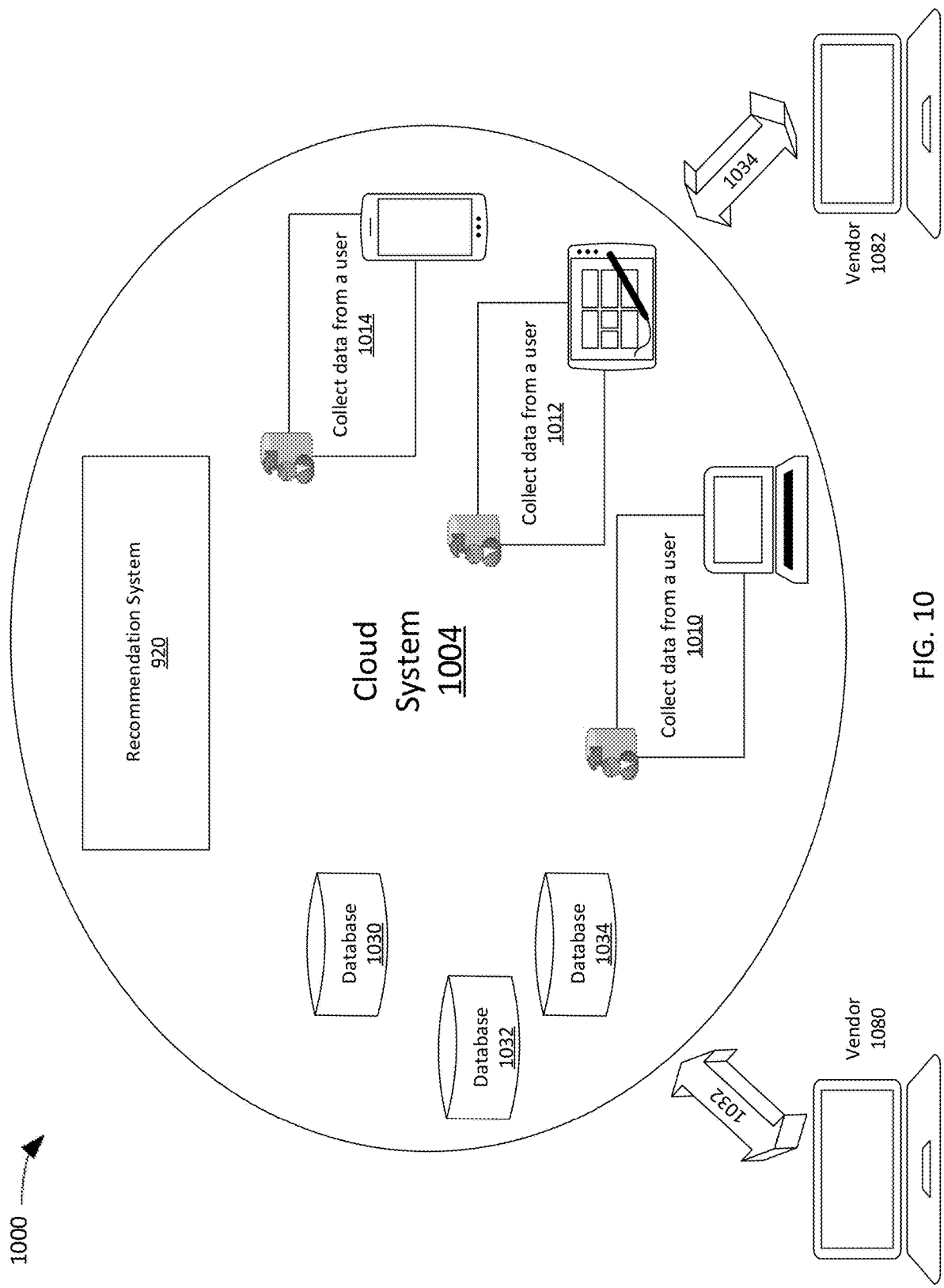
FIG. 10 illustrates an example cloud-based recommendation system including an example set of devices communicating with each other to collect user inputs or historic user inputs from databases, according to certain aspects of the present disclosure.
Figure 2A:
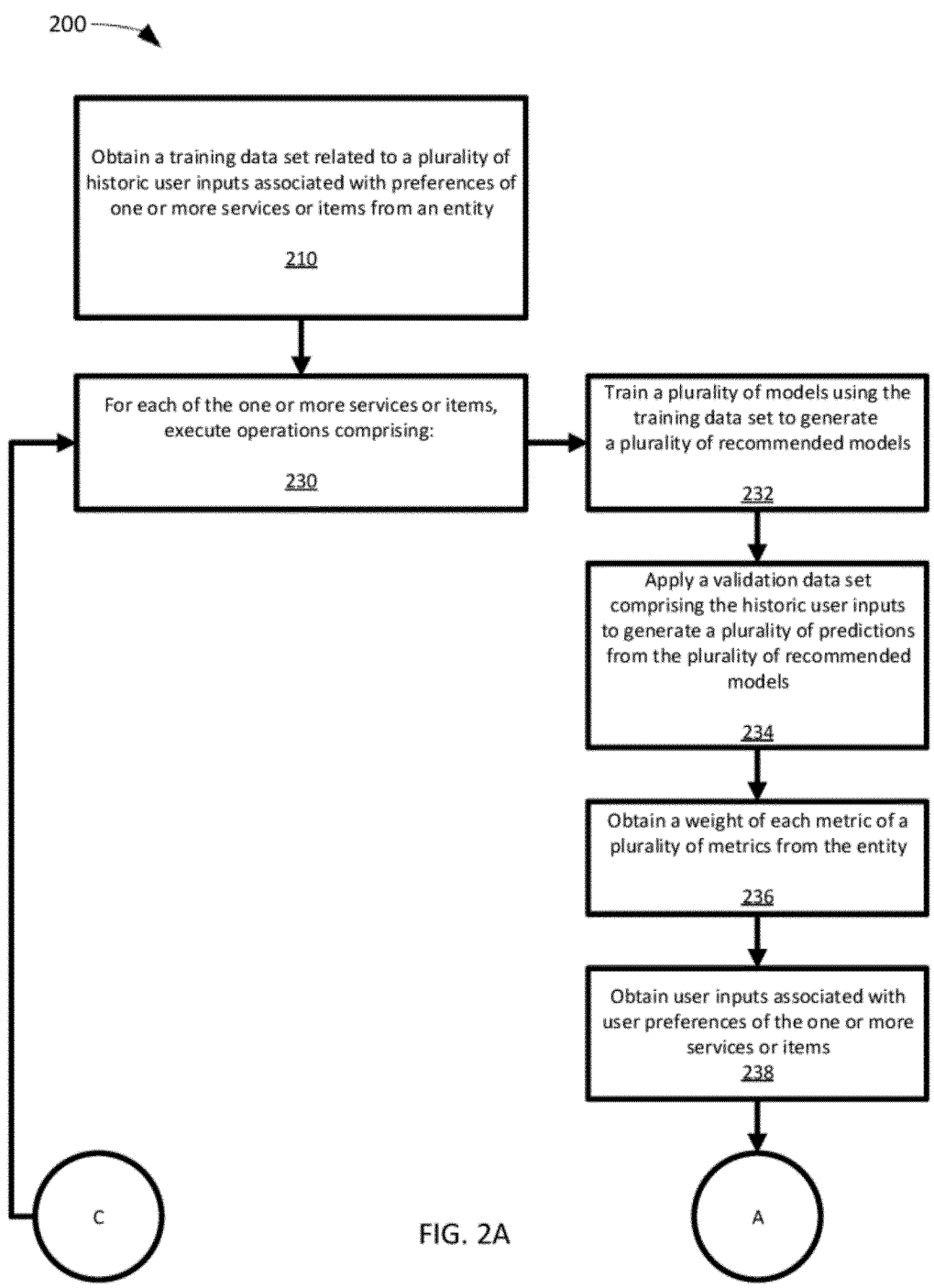
Figure 2C:
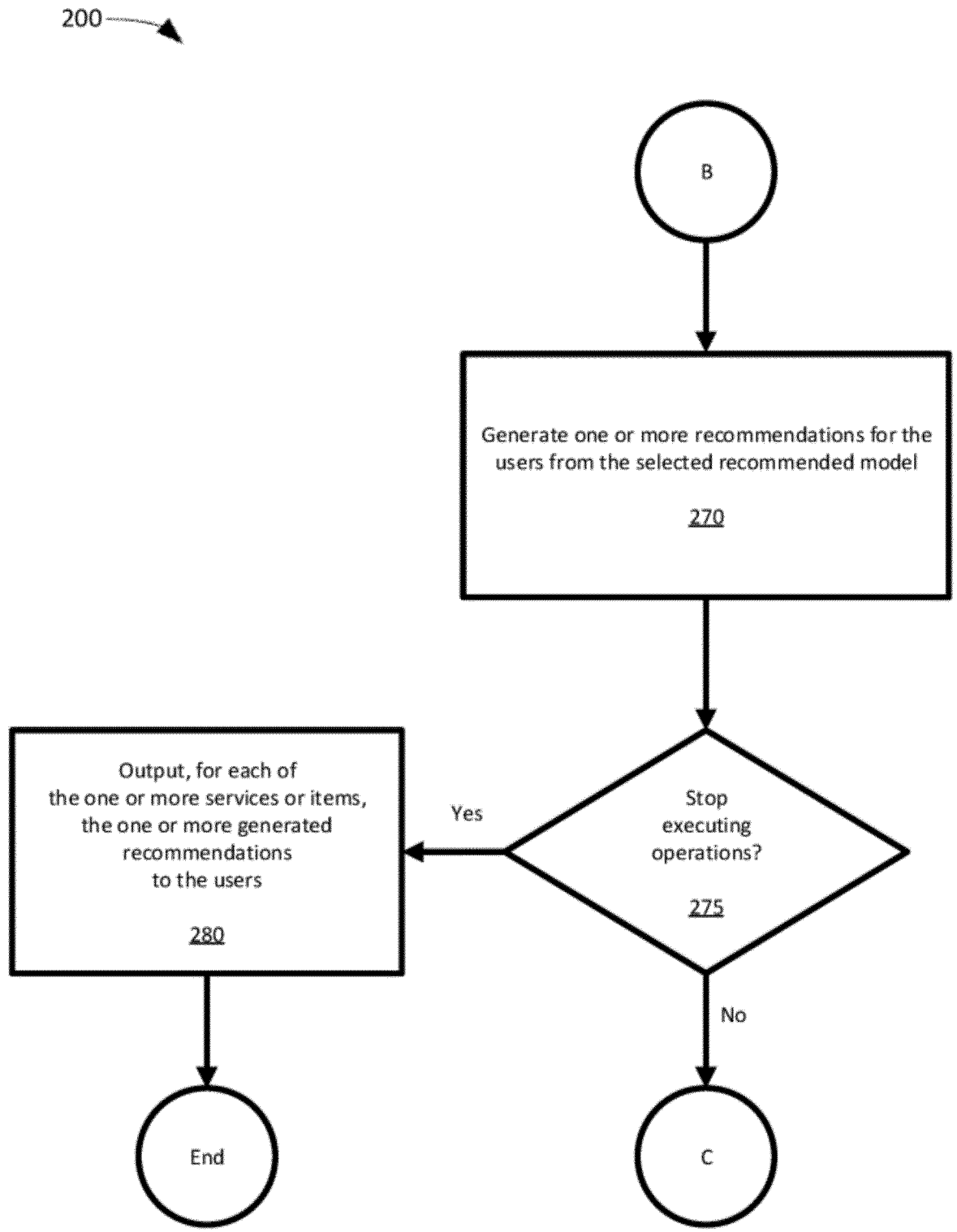
Figure 4A:
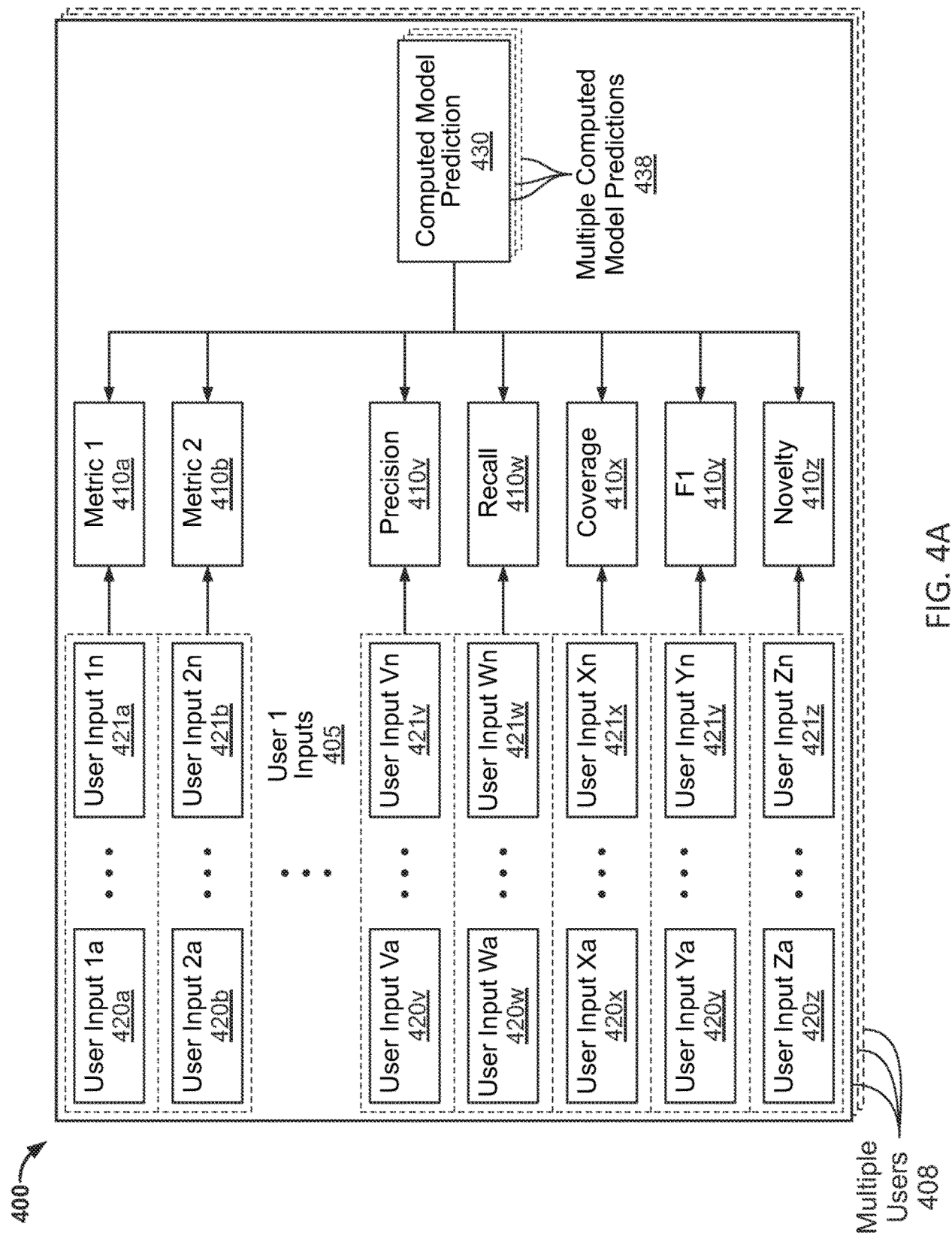

For block 210 in flow diagram 200 of FIG. 2A, the computing device may obtain a training data set related to a plurality of historic user inputs associated with preferences of one or more services or items from an entity. For example, as shown in flow diagram 300, the computing device may obtain the training data set 140 from a first storage device 310. The first storage device may include one or more databases. For example, as shown in FIG. 10, the unique recommendation system 920 may include a cloud-based recommendation system 1004 to host the MoE and at least one database for the training data set (e.g., Database 1030). For example, as shown in Table 1100 of FIG. 11, the training data set 1102 may include a first set of historic user profiles. The first set of historic user profiles may include one or more user preferences of one or more services or items. The one or more services or items may include, for example, network or electrical connectivity services, parts and services, extended warranties, accessories, repair or maintenance plans, or a mechanical part or accessory attached to a vehicle. The one or more services or items, for example, may relate to a user industry, a vehicle fleet size, a user region, a vehicle model, a vehicle type, a dealer network, or a vehicle trim. For example, the training data set 1102 may include one or more rows in a table with one or more columns for one or more users 1108 (e.g., User 1, User 2) that relate to the user industry 1110 (e.g., Construction, Rental Cars), the vehicle fleet size 1112 (e.g., Medium, Large), the user region 1114 (e.g., NC, MI, Northwestern US), the vehicle model 1116 (e.g., Model 1, Model 2), the vehicle type 1118 (e.g., Truck, SUV), the dealer network, or the vehicle trim 1120 (e.g., 4 door, SE). The training data set may also include in the one or more rows in the table a user's selection of the one or more services or items. For example, the training data set 1102 may include one or more rows in the table with one or more columns for one or more users 1108 (e.g., User 1, User 2) that selected or did not select Group A, Service 1 1122 (e.g., User 1=Yes or "1", User 2=No or "0").

Figure 3:
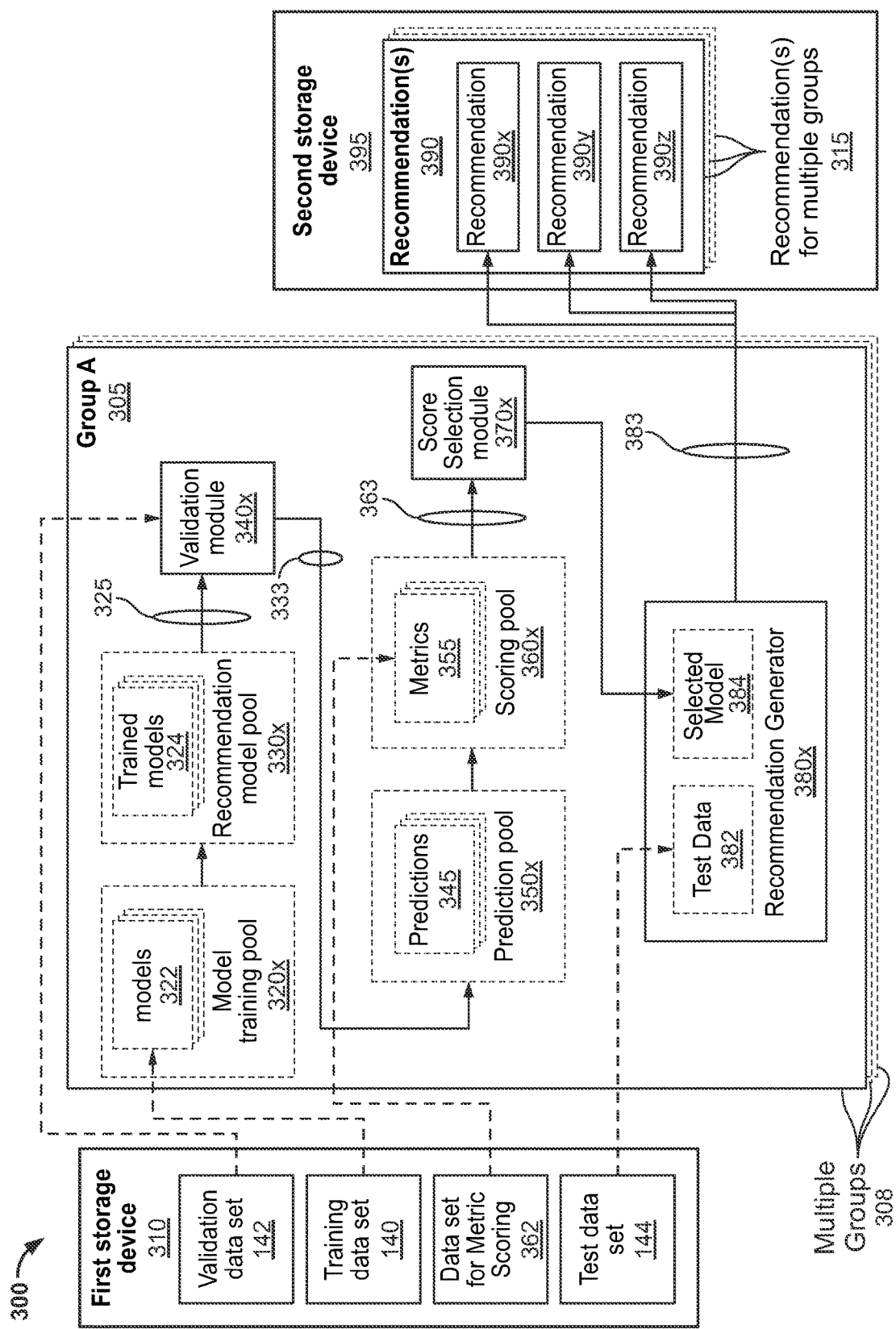
FIG. 3 illustrates an example flow diagram for executing a machine learning model application on a training data set, a validation data set, a test data set, and a data set for metric scoring to generate recommendations for one or more groups, according to certain aspects of the present disclosure.

For block 230 and block 232 in flow diagram 200 of FIG. 2A, the computing device may execute operations for each of the one or more services or items to include training a plurality of models using the training data set to generate a plurality of recommended models. The plurality of models may include one or more supervised machine learning models that may include a random forest, k-nearest neighbors, a matrix factorization, and factorization machines. For example, as shown in FIG. 3, the computing device may comprise a model training pool 320x that trains the plurality of models 322 (e.g., the random forest model, the k-nearest neighbors' model, the matrix factorization model, and the factorization machines' model) using the training data set 140 to generate a plurality of recommended models (e.g., Trained Models 324) for the recommendation model pool 330x.

For block 230 and block 234 in flow diagram 200 of FIG. 2A, the computing device may execute operations for each of the one or more services or items to include applying a validation data set comprising the historic user inputs to generate a plurality of predictions from the plurality of recommended models. For example, as shown in FIG. 3, the computing device may include the validation module 340x that applies the validation data set 142 including the historic user inputs to generate a plurality of predictions 345 for the prediction pool 350x from the plurality of recommended models (e.g., Trained Models 324) of the recommendation model pool 330x. The validation module may use the validation data set to compare the plurality of predictions from the plurality of recommended models to the historic user inputs that may include the one or more user preferences of the one or more services or items that may be in the validation data set. For example, as shown in Table 1100 of FIG. 11, the validation data set 1104 may include a second set of historic user profiles. The second set of historic user profiles may include one or more user preferences of one or more services or items. The one or more services or items may include, for example, network or electrical connectivity services, parts and services, extended warranties, accessories, repair or maintenance plans, or a mechanical part or accessory attached to a vehicle. The one or more services or items, for example, may relate to a user industry, a vehicle fleet size, a user region, a vehicle model, a vehicle type, a dealer network, or a vehicle trim. The validation data set 1104 may include one or more rows in the table with one or more columns for one or more users 1108 (e.g., User 3, User 4) that relate to the user industry 1110 (e.g., Telecom, R&D), the vehicle fleet size 1112 (e.g., Medium, Large), the user region 1114 (e.g., WV, SC), the vehicle model 1116 (e.g., Model 3, Model 4), the vehicle type 1118 (e.g., Car, SUV), the dealer network, or the vehicle trim 1120 (e.g., 4 door, LE). The validation data set may also include in the one or more rows in the table a user's selection of the one or more services or items. For example, the validation data set 1104 may include one or more rows in the table with one or more columns for one or more users 1108 (e.g., User 3, User 4) that selected or did not select Group B, Service 2 1124 (e.g., User 3=No or "0", User 4=Yes or "1").

For block 230 and block 236 in flow diagram 200 of FIG. 2A, the computing device may execute operations for each of the one or more services or items to include obtaining a weight of each metric of the plurality of metrics from the entity. For example, as shown in FIG. 3, the computing device may include the scoring pool 360x that obtains a weight of each metric of the plurality of metrics 355 from the entity from the data set for metric scoring 362 from a first storage device 310. The first storage device may include one or more databases. For example, as shown in flow diagram 470 of FIG. 4B, the computing device may obtain a weight (e.g., Weight 1 441a, Weight 2 441b, Weight_v 441v, Weight_w 441w, Weight_x 441x, Weight_y 441y, Weight_z 441z) of each metric of the plurality of metrics (e.g., Metric 1 410a, Metric 2 410b, Precision 410v, Recall 410w, Coverage 410x, F1 410y, Novelty 410z) from the entity from the data set for metric scoring (e.g., Data Set for Metric Scoring 362). The plurality of metrics may include, for example, precision, recall, F1, coverage, novelty, etc. Precision may include the fraction of recommendations generated that are relevant to the users. Precision may be defined as $$\text{Precision} = \frac{TP}{TP + FP},$$

where TP is true positive and FP is false positive. For example, Precision@k may include a number of the top-k recommendations that are relevant to the user/k, where k may include the number of items that are recommended. Recall may include the fraction of items relevant to the users that are included in the generated recommendations. Recall may be defined as $$\text{Recall} = \frac{TP}{TP + FN},$$

where TP is true positive and FN is false negative. For example, Recall@k may include a number of top-k recommendations that are relevant to the user/a number of possible items relevant to the user. F1 may include the harmonic mean between the precision and the recall. F1 may be defined as $$F1 = 2 \cdot \frac{\text{Precision} \cdot \text{Recall}}{\text{Precision} + \text{Recall}}.$$

Coverage may include the fraction of available items that are recommended to at least one user. For example, coverage may include a number of items recommended to at least one user/a total number of items available to recommend. Novelty may include the inverse of a fraction of users that purchased an item (e.g., items that are not frequently purchased by users). Novelty may be defined as 1−P, where P may include the fraction of users that purchased an item. If P=1, then P may include an item that all users purchased. If P=0, then P may include an item that no user purchased.

For block 230 and block 238 in flow diagram 200 of FIG. 2A, the computing device may execute operations for each of the one or more services or items to include obtaining user inputs associated with user preferences of the one or more services or items. For example, as shown in FIG. 3, the computing device may include the scoring pool 360x that obtains user inputs associated with user preferences of the one or more services or items from the data set for metric scoring 362 from the first storage device 310. For example, as shown in flow diagram 400 of FIG. 4A, the computing device may obtain user inputs (e.g., User 1 Inputs 405, User Input 1a 420a, User Input In 421a, etc.) associated with user preferences of the one or more services or items from the data set for metric scoring.

For block 230 in flow diagram 200 of FIG. 2A and for block 240 in flow diagram 200 of FIG. 2B, the computing device may execute operations for each of the one or more services or items to include determining a relevancy score for each metric of the plurality of metrics at least based on the operations of selecting each metric in the plurality of metrics. For example, as shown in FIG. 3, the computing device may include the scoring pool 360x that determines a relevancy score for each metric of the plurality of metrics 355 at least based on the operations of selecting each metric in the plurality of metrics 355. For example, as shown in flow diagram 400 of FIG. 4A, the computing device may determine the relevancy score for each metric of the plurality of metrics (e.g., Metric 1 410a, Metric 2 410b, Precision 410v, Recall 410w, Coverage 410x, F1 410y, Novelty 410z) at least based on the operations of selecting each metric in the plurality of metrics (e.g., Metric 1 410a, Metric 2 410b, Precision 410v, Recall 410w, Coverage 410x, F1 410y, Novelty 410z).

The computing device may execute operations for each of the one or more services or items to include determining a relevancy score for each metric of the plurality of metrics at least based on the operations of applying at least one prediction and at least one user preference to each selected metric. For example, as shown in FIG. 3, the computing device may include the scoring pool 360x that determines a relevancy score for each metric of the plurality of metrics 355 at least based on the operations of applying at least one prediction from the plurality of predictions 345. For example, as shown in flow diagram 400 of FIG. 4A, the computing device may determine the relevancy score for each metric of the plurality of metrics (e.g., Metric 1 410a, Metric 2 410b, Precision 410v, Recall 410w, Coverage 410x, F1 410y, Novelty 410z) at least based on the operations of applying at least one prediction (e.g., Computed Model Prediction 430) from the plurality of predictions (e.g. Multiple Computed Model Predictions 438).

The computing device may execute operations for each of the one or more services or items to include determining a relevancy score for each metric of the plurality of metrics at least based on the operations of applying a weight to the selected metric to generate the relevancy score for the selected metric. The weight may represent an indication of importance of the metric to the entity. For example, as shown in FIG. 3, the computing device may include the scoring pool 360x that determines a relevancy score for each metric of the plurality of metrics 355 at least based on the operations of applying a weight to the selected metric to generate the relevancy score for the selected metric. For example, as shown in flow diagram 400 of FIG. 4A, the computing device may determine the relevancy score for each metric of the plurality of metrics (e.g., Metric 1 410a, Metric 2 410b, Precision 410v, Recall 410w, Coverage 410x, F1 410y, Novelty 410z) at least based on the operations of applying at least one user preference (e.g., User Input Va 420v) to each selected metric (e.g., Precision 410v) to generate the relevancy score for the selected metric.

For block 230 in flow diagram 200 of FIG. 2A and for block 250 in flow diagram 200 of FIG. 2B, the computing device may execute operations for each of the one or more services or items to include selecting a recommended model from the plurality of recommended models based on the relevancy score of the selected metric or a combination of selected metrics. For example, as shown in FIG. 3, the computing device may include the score selection module 370x that selects a recommended model (e.g., Selected Model 384) from the plurality of recommended models (e.g., Trained Models 324) based on the relevancy score of the selected metric or a combination of selected metrics. For example, as shown in flow diagram 470 of FIG. 4B, the computing device may include the score selection module 370x that selects a recommended model from the plurality of recommended models based on the relevancy score (e.g., Scored Data 1 450a, Scored Data 2 450b, Scored Data V 450v, Scored Data W 450w, Scored Data X 450x, Scored Data Y 450y, Scored Data Z 450z) of the selected metric (e.g., Metric 1 410a, Metric 2 410b, Precision 410v, Recall 410w, Coverage 410x, F1 410y, Novelty 410z) or a combination of selected metrics (e.g., Precision 410v and Coverage 410x)).

For example, as shown in Table 1200 of FIG. 12, the selection of the recommended model from the plurality of recommended models is based on the relevancy score of the selected metric or the combination of selected metrics as derived from an optimization of the selected metric or an optimization of a combination of a plurality of selected metrics. The selection of the recommended model from the plurality of recommended models is also based on the relevancy score of the selected metric or the combination of selected metrics as derived from a ranking of the weights of the selected metric or the weights of a combination of a plurality of selected metrics.

In FIG. 12, for example, for the selected metric Precision@1 1202 as shown in the table 1200, the selection of the recommended model (e.g., Model 2 1222, Model 3 1224, and Model 4 1226) from the plurality of recommended models (e.g., Model 1 1220, Model 2 1222, Model 3 1224, and Model 4 1226) is based on the relevancy score (e.g., 0.5584 using Model 2 for Group C 1244, 0.8588 using Model 3 for Group B 1246, 0.9432 using Model 4 for Group A 1248), of the selected metric (e.g., Precision@1 1202) as derived from an optimization of the selected metric (e.g., Precision@1 1202) or a ranking of the weights of the selected metric (e.g., Weight of Precision@1 1202=1).

In FIG. 12, for example, for the equally weighted (e.g., 50 percent for each metric) combination of selected metrics Precision@1 1202 and Coverage@1 1208 as shown in the table 1200, the selection of the recommended model (e.g., Model 1 1220 and Model 2 1222) from the plurality of recommended models (e.g., Model 1 1220, Model 2 1222, Model 3 1224, and Model 4 1226) is based on the relevancy score (e.g., 0.737 for Precision@1 and 1 for Coverage@1 using Model 1 for Group B 1240, 0.9426 for Precision@1 and 1 for Coverage@1 using Model 2 for Group A 1242), of the combination of selected metrics (e.g., Precision@1 1202 and Coverage@1 1208) as derived from an optimization of a combination of a plurality of selected metrics (e.g., Precision@1 1202 and Coverage@1 1208) or a ranking of the weights of a combination of a plurality of selected metrics (e.g., Weight of Precision@1 1202=0.50 and Weight of Coverage@1 1208=0.50).

For block 230 in flow diagram 200 of FIG. 2A and optionally for block 260 in flow diagram 200 of FIG. 2C, the computing device may execute operations for each of the one or more services or items to include applying a test data set comprising the user inputs to the selected recommended model. For example, as shown in FIG. 3, the computing device may include the recommendation generator 380x that applies a test data set 144 that includes the user inputs (e.g., Test Data 382) to the selected recommended model 384. For example, as shown in flow diagram 470 of FIG. 4B, the computing device may include the recommendation generator 380x that applies test data (e.g., Test Data 382) that includes the user inputs to the selected recommended model. As shown in Table 1100 of FIG. 11, the test data set 1106 may include a third set of historic user profiles. The third set of historic user profiles may include user inputs of the one or more services or items that are selected by the entity to display to the users for users to provide to the entity an indication of their one or more user preferences of the one or more services or items. The one or more services or items may include, for example, network or electrical connectivity services, parts and services, extended warranties, accessories, repair or maintenance plans, or a mechanical part or accessory attached to a vehicle. The one or more services or items, for example, may relate to a user industry, a vehicle fleet size, a user region, a vehicle model, a vehicle type, a dealer network, or a vehicle trim. For example, the test data set 1106 may include at least one row in the table with one or more columns for at least one user (e.g., User N) that relates to the user industry 1110 (e.g., Delivery), the vehicle fleet size 1112 (e.g., Medium), the user region 1114 (e.g., IL), the vehicle model 1116 (e.g., Model N), the vehicle type 1118 (e.g., Van), the dealer network, or the vehicle trim 1120 (e.g., XL). The test data set may also include in the at least one row in the table a user's selection of the one or more services or items. For example, the test data set 1106 may include at least one row in the table with one or more columns for one or more users 1108 (e.g., User N) that selected Group N, Service N 1126 (e.g., User N=Yes or "1").

For block 230 in flow diagram 200 of FIG. 2A and for block 270 in flow diagram 200 of FIG. 2C, the computing device may execute operations for each of the one or more services or items to include generating one or more recommendations for the users from the selected recommended model. For example, as shown in FIG. 3, the computing device may include the recommendation generator 380x that also generates one or more recommendations (e.g., Recommendation(s) 390, Recommendation 390x, Recommendation 390y, Recommendation 390z, Recommendation(s) for multiple groups 315) for the users from the selected recommended model (e.g., Selected Model 384). For example, as shown in flow diagram 470 of FIG. 4B, the computing device may include the recommendation generator 380x that also generates one or more recommendations (e.g., Recommendation(s) 390, Recommendation 390x, Recommendation 390y, Recommendation 390z) for the users from the selected recommended model. The computing device may continue to execute operations for each of the one or more services or items by returning to block 230 in flow diagram 200 of FIG. 2A to train a plurality of models using a different training data set or the entity selects different metrics from the plurality of metrics. For block 230 in flow diagram 200 of FIG. 2A and for block 275 in flow diagram 200 of FIG. 2C, the computing device may stop executing operations for each of the one or more services or items after each of the one or more of the services or items have generated one or more recommendations for the users from the selected recommendation model.

After the computing device stops executing operations for each of the one or more services or items, for block 280 in flow diagram 200 of FIG. 2C, the computing device may output, for each of the one or more services or items, the one or more generated recommendations to the users. For example, as shown in FIG. 3, the computing device may output the one or more generated recommendations (e.g., Recommendation(s) 390, Recommendation 390x, Recommendation 390y, Recommendation 390z, Recommendation(s) for multiple groups 315) to the users for each of the one or more services or items for the one or more groups (e.g, Group A 305, Multiple Groups 308) to a second storage device 395. For example, as shown in flow diagram 470 of FIG. 4B, the computing device may output the one or more generated recommendations (e.g., Recommendation(s) 390, Recommendation 390x, Recommendation 390y, Recommendation 390z) to the users for each of the one or more services or items for the one or more groups (e.g., Multiple Groups 409) to a second storage device. For example, Table 1300 shows the output of the one or more generated recommendations in a column 1344 (Extended Service Plan, Telematics Vehicle Location, Data Command & Control Services, Data Fuel Services, Telematics Driver Score) to the users in a column 1340 (e.g., User 1, User 2, User 3, User 4, . . . User N) for each of the one or more services or items. The one or more services or items may include, for example, network or electrical connectivity services, parts and services, extended warranties, accessories, repair or maintenance plans, downloads for performance improvements and software upgrades, or a mechanical part or accessory attached to a vehicle. For example, rows 1302, 1304 and 1306 of the table 1300 include the output of three generated recommendations of Extended Service Plan, Telematics Vehicle Location, and Data Command & Control Services to User 1 for each of the one or more services or items (e.g., extended warranties, network or electrical connectivity services, and network or electrical connectivity services). These rows also include the selected recommended model in a column 1342, Model 1, that generates the three recommendations (Extended Service Plan, Telematics Vehicle Location, and Data Command & Control Services) in a column 1344 for User 1 in a column 1340 and the relevancy scores in a column 1346 of 70, 50, and 40, of the selected metric or the combination of selected metrics for the selected recommended model (Model 1).

FIG. 3 illustrates an example flow diagram for executing machine learning model application on a training data set, a validation data set, a test data set, and a data set for metric scoring to generate recommendations for one or more groups, according to certain aspects of the present disclosure. For example, as shown in flow diagram 300, the computing device may include a first storage device 310 that may comprise the training data set 140, the validation data set 142, the test data set 144, and the data set for metric scoring 362.

The computing device may include the one or more groups (e.g., Group A 305, Multiple Groups 308) that may comprise a model training pool 320x, a recommendation model pool 330x, a validation module 340x, a prediction pool 350x, a scoring pool 360x, a score selection module 370x, and a recommendation generator 380x. The computing device may also include the one or more groups (e.g., Group A 305, Multiple Groups 308) that may comprise the one or more first outputs 325 of the recommendation model pool 330x, the one or more second outputs 333) of the validation module 340x, the one or more third outputs 363 of the scoring pool 360x, and the one or more fourth outputs 383 of the recommendation generator 380x.

The computing device may comprise the model training pool 320x that trains a plurality of models 322 using the training data set 140 to generate a plurality of recommended models (e.g., Trained Models 324) for the recommendation model pool 330x. The plurality of models include one or more supervised machine learning models that may include a random forest, k-nearest neighbors, a matrix factorization, and factorization machines.

The computing device may include the validation module 340x that applies the validation data set 142 including the historic user inputs to generate a plurality of predictions 345 for the prediction pool 350x from the plurality of recommended models (e.g., Trained Models 324) of the recommendation model pool 330x. The historic user inputs may include one or more user preferences of the one or more services or items. The one or more services or items are selected by the entity to display to the users for users to provide to the entity an indication of their one or more user preferences of the one or more services or items. The one or more services or items may include, for example, network or electrical connectivity services, parts and services, extended warranties, accessories, repair or maintenance plans, or a mechanical part or accessory attached to a vehicle. The one or more services or items may relate to a user industry, a vehicle fleet size, a user region, a vehicle model, a vehicle type, a dealer network, or a vehicle trim.

The computing device may include the scoring pool 360x that obtains user inputs associated with user preferences of the one or more services or items from the data set for metric scoring 362. The user inputs may also include one or more user preferences of the one or more services or items. The computing device may include the scoring pool 360x that also obtains a weight of each metric of the plurality of metrics 355 from the entity from the data set for metric scoring 362. The plurality of metrics may include, for example, precision, recall, F1, coverage, novelty, etc. Precision may include the fraction of recommendations generated that are relevant to the users. For example, Precision@k may include a number of the top-k recommendations that are relevant to the user/k. Recall may include the fraction of items relevant to the users that are included in the generated recommendations. For example, Recall@k may include a number of top-k recommendations that are relevant to the user/a number of possible items relevant to the user. Coverage may include the fraction of available items that are recommended to at least one user. For example, coverage may include a number of items recommended to at least one user/a total number of items available to recommend.

The computing device may include the scoring pool 360x that determines a relevancy score for each metric of the plurality of metrics 355 at least based on the operations of: selecting each metric in the plurality of metrics 355, applying at least one prediction from the plurality of predictions 345 and at least one user preference to each selected metric, and applying a weight to the selected metric to generate the relevancy score for the selected metric.

The computing device may include the score selection module 370x that selects a recommended model (e.g., Selected Model 384) from the plurality of recommended models (e.g., Trained Models 324) based on the relevancy score of the selected metric or a combination of selected metrics.

The computing device may include the recommendation generator 380x that applies a test data set 144 that includes the user inputs (e.g., Test Data 382) to the selected recommended model (e.g., Selected Model 384). The computing device may include the recommendation generator 380x that also generates one or more recommendations (e.g., Recommendation(s) 390, Recommendation 390x, Recommendation 390y, Recommendation 390z, Recommendation(s) for multiple groups 315) for the users from the selected recommended model (e.g., Selected Model 384).

The computing device may include a second storage device 395 that outputs the one or more generated recommendations 390 (e.g., Recommendation(s) 390, Recommendation 390x, Recommendation 390y, Recommendation 390z, Recommendation(s) for multiple groups 315) to the users for each of the one or more services or items for the one or more groups (e.g., Group A 305, Multiple Groups 308).

Figure 4A:
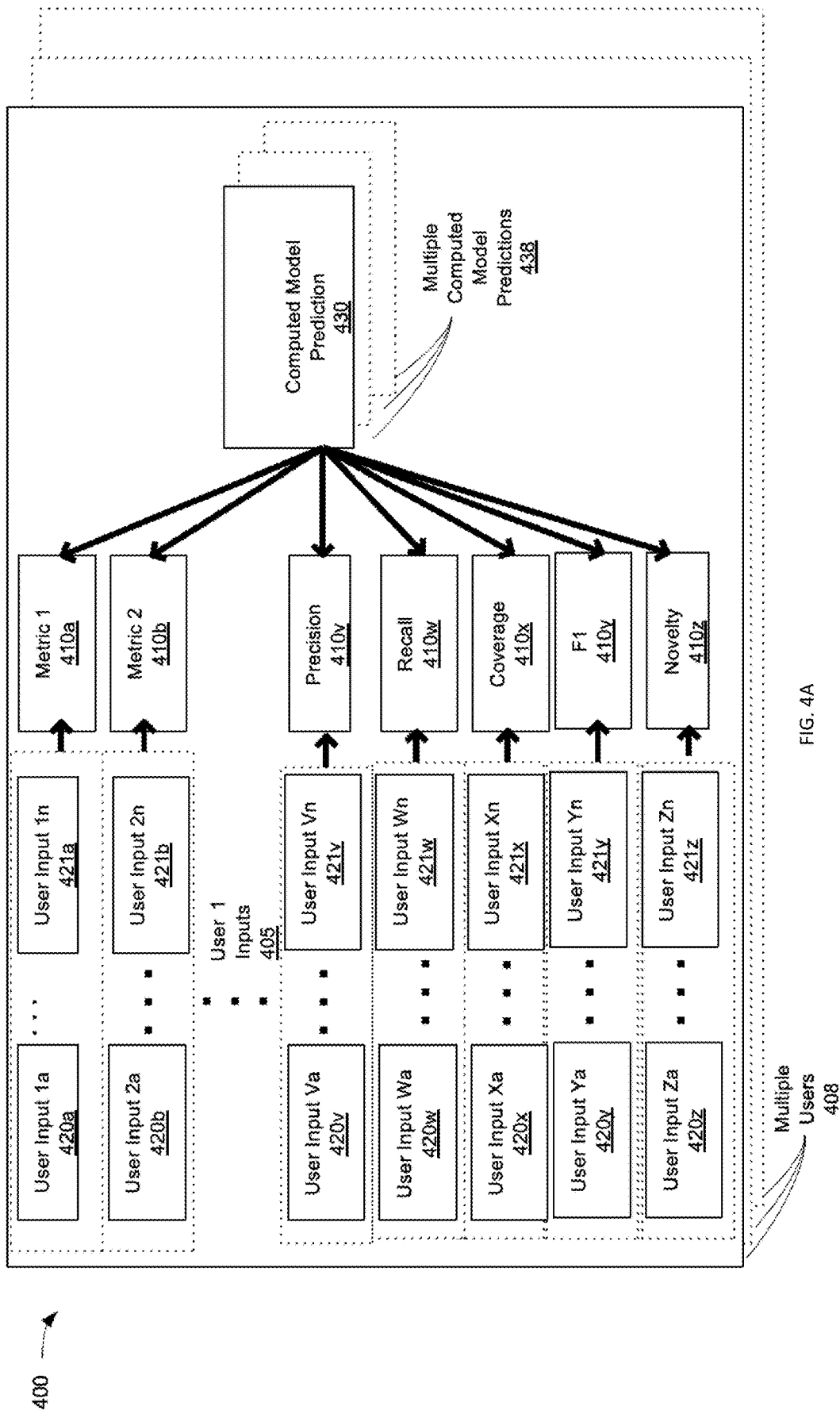
FIGS. 4A and 4B illustrate example flow diagrams for determining a relevancy score for metrics based at least on operations to generate recommendations for users from a selected recommended model, according to certain aspects of the present disclosure.
Figure 4B:
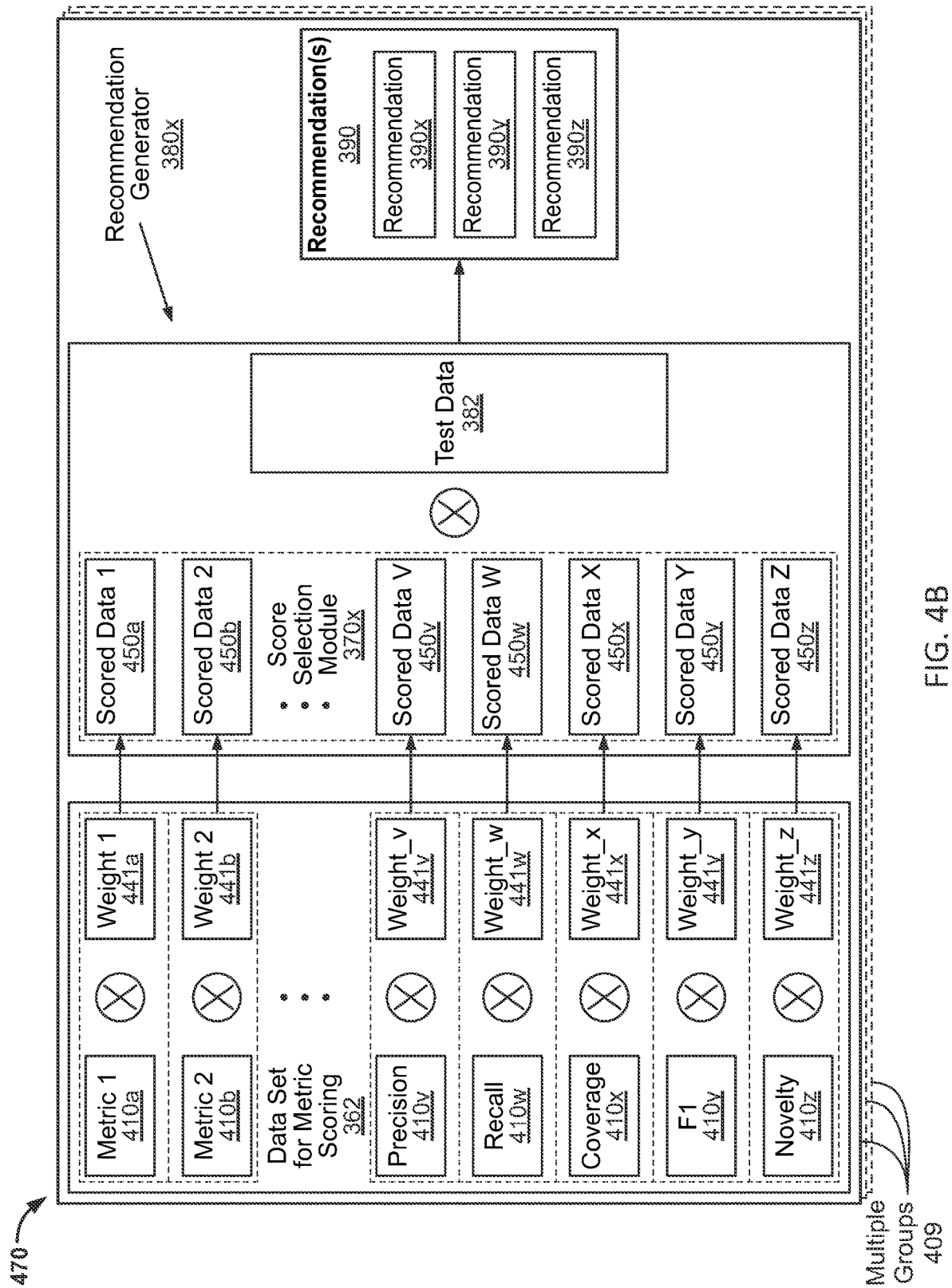

FIGS. 4A and 4B illustrate example flow diagrams for determining a relevancy score for metrics based at least on operations to generate recommendations for users (e.g., Multiple Users 408) from a selected recommended model, according to certain aspects of the present disclosure. For example, as shown in flow diagram 400, the computing device may obtain user inputs (e.g., User 1 Inputs 405, User Input 1a 420a, User Input In 421a, User Input 2a 420b, User Input 2n 421b, User Input Va 420v, User Input Vn 421v, User Input Wa 420w, User Input Wn 421w, User Input Xa 420x, User Input Xn 421x, User Input Ya 420y, User Input Yn 421y, User Input Za 420z, User Input Zn 421z) associated with user preferences of the one or more services or items from the data set for metric scoring. The computing device may determine the relevancy score for each metric of the plurality of metrics (e.g., Metric 1 410a, Metric 2 410b, Precision 410v, Recall 410w, Coverage 410x, F1 410y, Novelty 410z) at least based on the operations of: selecting each metric in the plurality of metrics (e.g., Metric 1 410a, Metric 2 410b, Precision 410v, Recall 410w, Coverage 410x, F1 410y, Novelty 410z), applying at least one prediction (e.g., Computed Model Prediction 430) from the plurality of predictions (e.g. Multiple Computed Model Predictions 438) and at least one user preference (e.g., User Input Va 420v) to each selected metric (e.g., Precision 410v).

For example, as shown in flow diagram 470, the computing device may obtain a weight of each metric of the plurality of metrics (e.g., Metric 1 410a, Metric 2 410b, Precision 410v, Recall 410w, Coverage 410x, F1 410y, Novelty 410z) from the entity from the data set for metric scoring (e.g., Data Set for Metric Scoring 362). The plurality of metrics may include, for example, precision, recall, F1, coverage, novelty, etc. Precision may include the fraction of recommendations generated that are relevant to the users. For example, Precision@k may include a number of the top-k recommendations that are relevant to the user/k. Recall may include the fraction of items relevant to the users that are included in the generated recommendations. For example, Recall@k may include a number of top-k recommendations that are relevant to the user/a number of possible items relevant to the user. Coverage may include the fraction of available items that are recommended to at least one user. For example, coverage may include a number of items recommended to at least one user/a total number of items available to recommend. The computing device may apply a weight (e.g., Weight_v 441v) to the selected metric (e.g., Precision 410v) to generate the relevancy score (e.g., Scored Data V 450v) for the selected metric (e.g., Precision 410v). The weight represents an indication of importance of the metric to the entity. The computing device may include the score selection module 370*x* that selects a recommended model from the plurality of recommended models based on the relevancy score (e.g., Scored Data V 450*v*) of the selected metric (e.g., Precision 410*v*) or based on the relevancy score (e.g., Scored Data V 450*v*, Scored Data X 450*x*) of a combination of selected metrics (e.g., Precision 410*v* and Coverage 410*x*)). The computing device may include the recommendation generator 380*x* that applies test data (e.g., Test Data 382) that includes the user inputs to the selected recommended model. The computing device may include the recommendation generator 380*x* that also generates one or more recommendations (e.g., Recommendation(s) 390, Recommendation 390*x*, Recommendation 390*y*, Recommendation 390*z*) for the users from the selected recommended model. The computing device may include a second storage device that outputs the one or more generated recommendations (e.g., Recommendation(s) 390, Recommendation 390*x*, Recommendation 390*y*, Recommendation 390*z*) to the users for each of the one or more services or items for the one or more groups (e.g., Multiple Groups 409).

Figure 5:
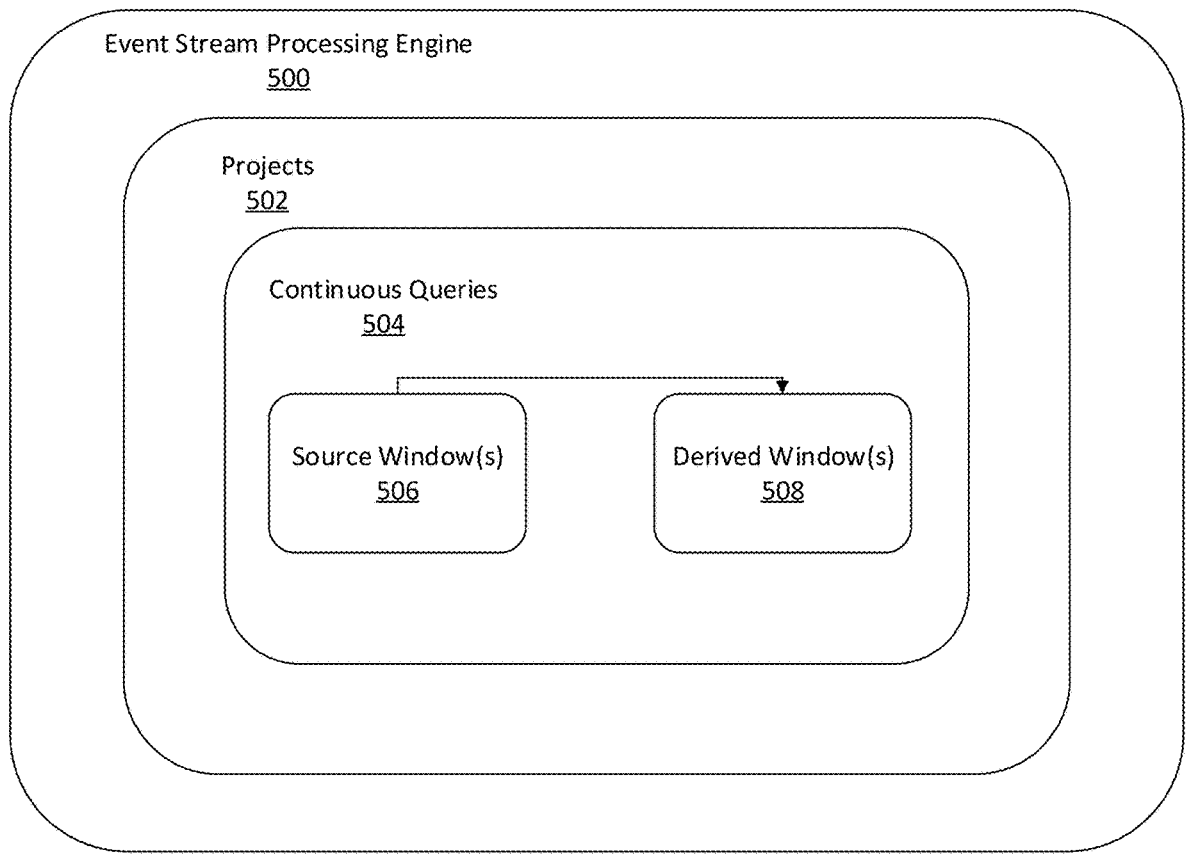
FIG. 5 illustrates a block diagram including components of an Event Stream Processing Engine (ESPE), according to certain aspects of the present disclosure.

FIG. 5 illustrates a block diagram including components of an Event Stream Processing Engine (ESPE), according to certain aspects of the present disclosure. ESPE 500 may include one or more projects 502. A project may be described as a second-level container in an engine model managed by ESPE 500 where a thread pool size for the project may be defined by a user. Each project of the one or more projects 502 may include one or more continuous queries 504 that contain data flows, which are data transformations of incoming event streams. The one or more continuous queries 504 may include one or more source windows 506 and one or more derived windows 508.

Figure 9:
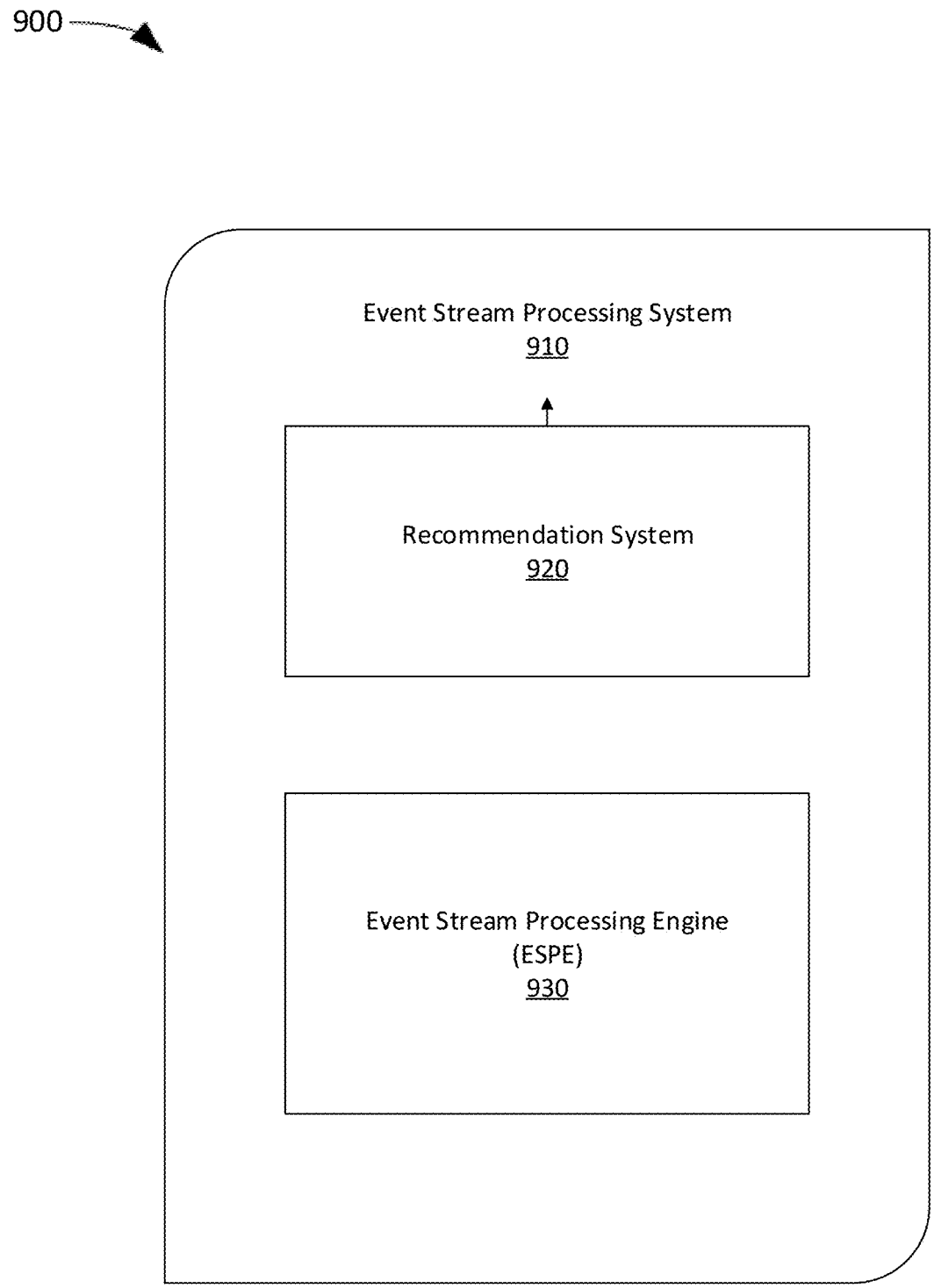
FIG. 9 illustrates an example block diagram including components of an ESP system, according to certain aspects of the present disclosure.

The ESPE may receive streaming data over a period of time related to certain events, such as events or other data sensed by multiple devices. The ESPE may perform operations associated with processing data created by the multiple devices. For example, as shown in FIG. 9, an event stream processing (ESP) system 910 may include the unique recommendation system 920 for executing the operations of the recommendation system on an Event Stream Processing Engine (ESPE) 930. As noted, the multiple devices may include sensors that sense different aspects of their environments, and may collect data over time based on those sensed observations. For example, the ESPE may be implemented within one or more of systems 910 shown in FIG. 9. The ESPE may be implemented within such a system by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 502. In an illustrative embodiment, for example, there may be only one ESPE 500 for each instance of the ESP application, and ESPE 500 may have a unique engine name. Additionally, the one or more projects 502 may each have unique project names, and each query may have a unique continuous query name and begin with a uniquely named source window of the one or more source windows 506. ESPE 500 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 506 and the one or more derived windows 508 represent continuously executing queries that generate updates to a query result set as new event blocks stream through ESPE 500. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 500 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 504 transforms a source event stream made up of streaming event block objects published into ESPE 500 into one or more output event streams using the one or more source windows 506 and the one or more derived windows 508. A continuous query can also be thought of as data flow modeling.

The one or more source windows 506 are at the top of the directed graph and have no windows feeding into them. Event streams are published into the one or more source windows 506, and from there, the event streams may be directed to the next set of connected windows as defined by the directed graph. The one or more derived windows 508 are all instantiated windows that are not source windows and that have other windows streaming events into them. The one or more derived windows 508 may perform computations or transformations on the incoming event streams. The one or more derived windows 508 transform event streams based on the window type (that is operators such as join, filter, compute, aggregate, copy, pattern match, procedural, union, etc.) and window settings. As event streams are published into ESPE 500, they are continuously queried, and the resulting sets of derived windows in these queries are continuously updated.

Figure 6:
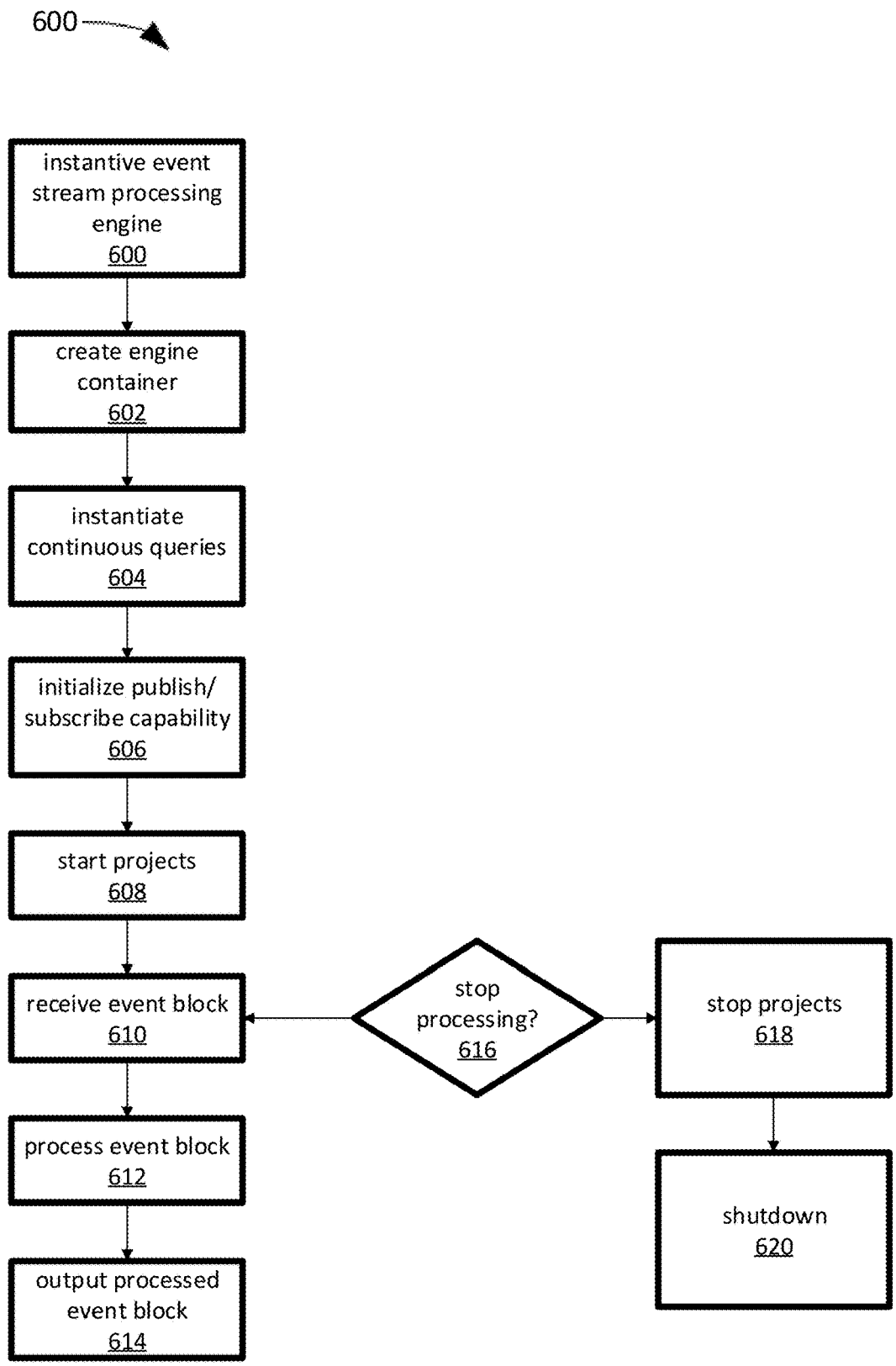
FIG. 6 illustrates a flow chart showing an example process including operations performed by an event stream processing engine, according to certain aspects of the present disclosure.

FIG. 6 illustrates a flow chart showing an example process including operations performed by an event stream processing engine, according to certain aspects of the present disclosure. As noted, the ESPE 500 (or an associated ESP application) defines how input event streams are transformed into meaningful output event streams. More specifically, the ESP application may define how input event streams from publishers (e.g., multiple devices providing sensed data) are transformed into meaningful output event streams consumed by subscribers (e.g., a data analytics project being executed by a system or set of systems).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 600, an ESP application may define and start an ESPE, thereby instantiating an ESPE at a device, such as system 700 and/or 910. In an operation 602, the engine container is created. For illustration, ESPE 500 may be instantiated using a function call that specifies the engine container as a manager for the model.

In an operation 604, the one or more continuous queries 504 are instantiated by ESPE 500 as a model. The one or more continuous queries 504 may be instantiated with a dedicated thread pool or pools that generate updates as new events stream through ESPE 500. For illustration, the one or more continuous queries 504 may be created to model business processing logic within ESPE 500, to predict events within ESPE 500, to model a physical system within ESPE 500, to predict the physical system state within ESPE 500, etc. For example, as noted, ESPE 500 may be used to support sensor data monitoring and management (e.g., sensing may include the recommendation systems that are operating within a heterogeneous mixture of experts model (MoE) to select an optimal combination of recommendation systems that produce recommendations of the one or more services or items to the users based on an indication of relevancies of the metrics to the entity).

ESPE 500 may analyze and process events in motion or "event streams." Instead of storing data and running queries against the stored data, ESPE 500 may store queries and stream data through them to allow continuous analysis of data as it is received. The one or more source windows 506 and the one or more derived windows 508 may be created based on the relational, pattern matching, and procedural algorithms that transform the input event streams into the output event streams to model, simulate, score, test, predict, etc. based on the continuous query model defined and application to the streamed data.

In an operation 606, a publish/subscribe (pub/sub) capability is initialized for ESPE 500. In an illustrative embodiment, a pub/sub capability is initialized for each project of the one or more projects 502. To initialize and enable pub/sub capability for ESPE 500, a port number may be provided. Pub/sub clients can use a host name of an ESP device running the ESPE and the port number to establish pub/sub connections to ESPE 500.

Figure 7:
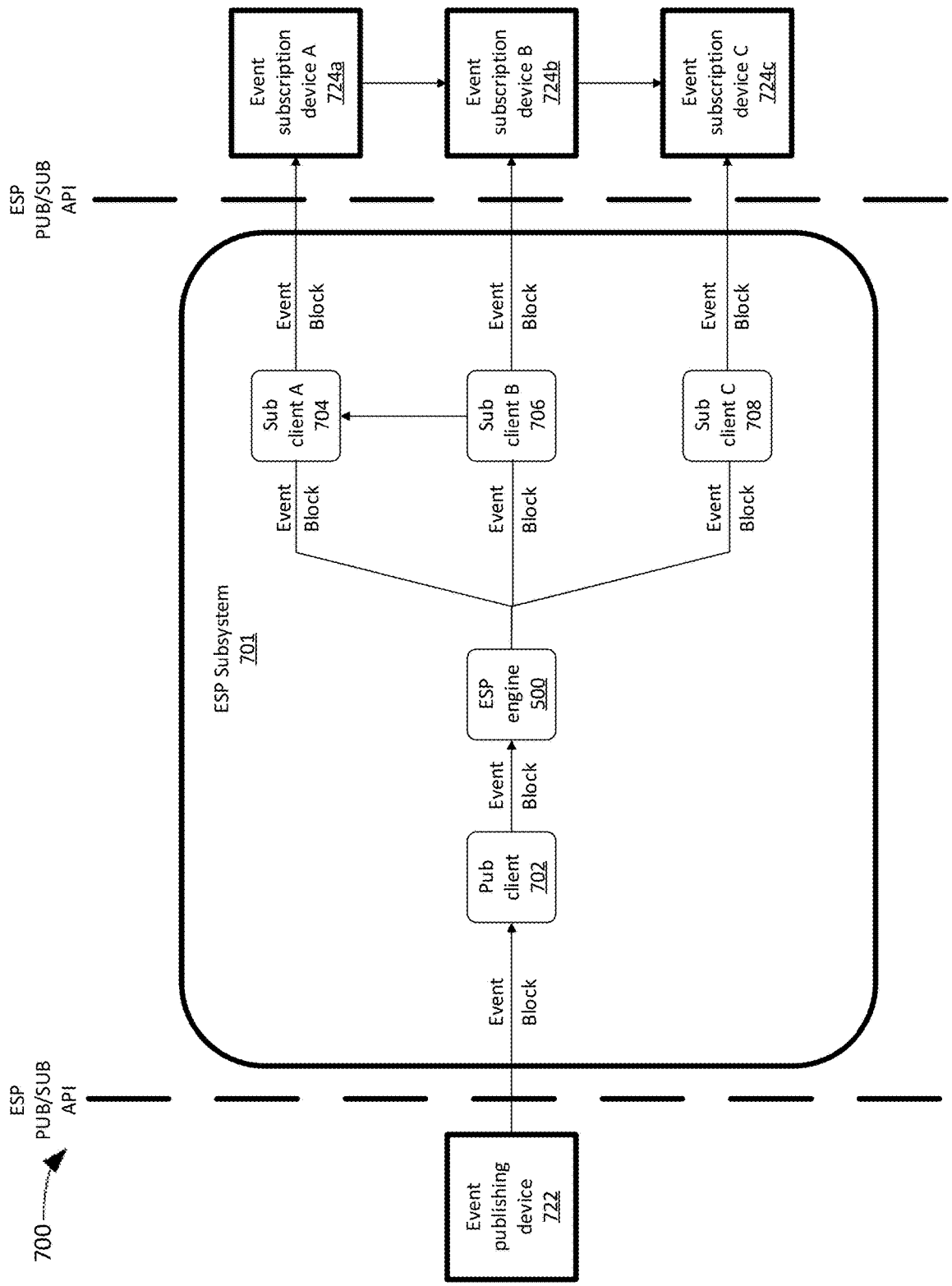
FIG. 7 illustrates an Event Stream Processing (ESP) system interfacing between a publishing device and multiple event subscribing devices, according to certain aspects of the present disclosure.

FIG. 7 illustrates an ESP system 700 interfacing between publishing device 722 and event subscribing devices 724a-c, according to certain aspects of the present disclosure. ESP system 700 may include ESP device or subsystem 701, event publishing device 722, an event subscribing device A 724a, an event subscribing device B 724b, and an event subscribing device C 724c. Input event streams are output to ESP device or subsystem 701 by publishing device 722. In alternative embodiments, the input event streams may be created by a plurality of publishing devices. The plurality of publishing devices further may publish event streams to other ESP devices. The one or more continuous queries instantiated by ESPE 500 may analyze and process the input event streams to form output event streams output to event subscribing device A 724a, event subscribing device B 724b, and event subscribing device C 724c. ESP system 700 may include a greater or a fewer number of event subscribing devices of event subscribing devices.

Publish-subscribe is a message-oriented interaction paradigm based on indirect addressing. Processed data recipients specify their interest in receiving information from ESPE 500 by subscribing to specific classes of events, while information sources publish events to ESPE 500 without directly addressing the receiving parties. ESPE 500 coordinates the interactions and processes the data. In some cases, the data source receives confirmation that the published information has been received by a data recipient.

A publish/subscribe API may be described as a library that enables an event publisher, such as publishing device 722, to publish event streams into ESPE 500 or an event subscriber, such as event subscribing device A 724a, event subscribing device B 724b, and event subscribing device C 724c, to subscribe to event streams from ESPE 500. For illustration, one or more publish/subscribe APIs may be defined. Using the publish/subscribe API, an event publishing application may publish event streams into a running event stream processor project source window of ESPE 500, and the event subscription application may subscribe to an event stream processor project source window of ESPE 500.

The publish/subscribe API provides cross-platform connectivity and endianness compatibility between ESP application and other networked applications, such as event publishing applications instantiated at publishing device 722, and event subscription applications instantiated at one or more of event subscribing device A 724a, event subscribing device B 724b, and event subscribing device C 724c.

Referring back to FIG. 6, operation 606 initializes the publish/subscribe capability of ESPE 500. In an operation 608, the one or more projects 502 are started. The one or more started projects may run in the background on an ESP device. In an operation 610, an event block object is received from one or more computing devices of the event publishing device 722.

ESP device or subsystem 701 may include a publishing client 702, ESPE 500, a subscribing client A 704, a subscribing client B 706, and a subscribing client C 708. Publishing client 702 may be started by an event publishing application executing at publishing device 722 using the publish/subscribe API. Subscribing client A 704 may be started by an event subscription application A, executing at event subscribing device A 724a using the publish/subscribe API. Subscribing client B 706 may be started by an event subscription application B executing at event subscribing device B 724b using the publish/subscribe API. Subscribing client C 708 may be started by an event subscription application C executing at event subscribing device C 724c using the publish/subscribe API.

An event block object containing one or more event objects is injected into a source window of the one or more source windows 506 from an instance of an event publishing application on event publishing device 722. The event block object may be generated, for example, by the event publishing application and may be received by publishing client 702. A unique ID may be maintained as the event block object is passed between the one or more source windows 506 and/or the one or more derived windows 508 of ESPE 500, and to subscribing client A 704, subscribing client B 706, and subscribing client C 708 and to event subscription device A 724a, event subscription device B 724b, and event subscription device C 724c. Publishing client 702 may further generate and include a unique embedded transaction ID in the event block object as the event block object is processed by a continuous query, as well as the unique ID that publishing device 722 assigned to the event block object.

In an operation 612, the event block object is processed through the one or more continuous queries 504. In an operation 614, the processed event block object is output to one or more computing devices of the event subscribing devices 724a-c. For example, subscribing client A 704, subscribing client B 706, and subscribing client C 708 may send the received event block object to event subscription device A 724a, event subscription device B 724b, and event subscription device C 724c, respectively.

ESPE 500 maintains the event block containership aspect of the received event blocks from when the event block is published into a source window and works its way through the directed graph defined by the one or more continuous queries 504 with the various event translations before being output to subscribers. Subscribers can correlate a group of subscribed events back to a group of published events by comparing the unique ID of the event block object that a publisher, such as publishing device 722, attached to the event block object with the event block ID received by the subscriber.

In an operation 616, a determination is made concerning whether or not processing is stopped. If processing is not stopped, processing continues in operation 610 to continue receiving the one or more event streams containing event block objects from the, for example, multiple devices. If processing is stopped, processing continues in an operation 618. In operation 618, the started projects are stopped. In operation 620, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 3, data may be collected from multiple devices that may include a first storage device 310 that may comprise the training data set 140, the validation data set 142, the test data set 144, and the data set for metric scoring 362. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable storage medium operably coupled to the processor. The processor is configured to execute an ESP engine (ESPE). The computer-readable storage medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable storage medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable storage medium.

Figure 8:
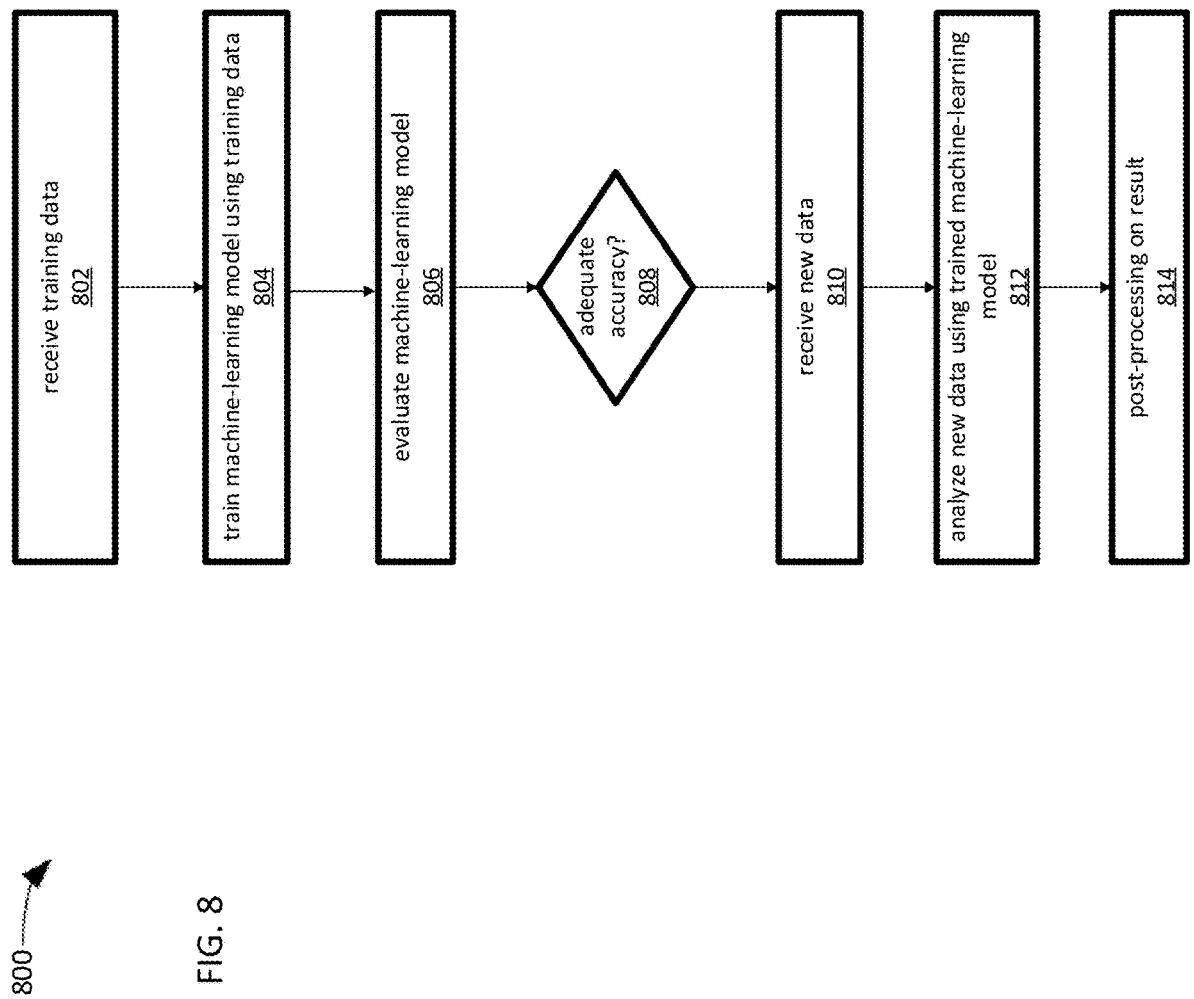
FIG. 8 illustrates a flow chart of an example of a process for generating and using a machine-learning model, according to certain aspects of the present disclosure.

FIG. 8 is a flow chart 800 of an example of a process for generating and using a machine-learning model, according to certain aspects of the present disclosure. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 8.

In block 802, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 804, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 806, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 808, the machine-learning model has an inadequate degree of accuracy for a particular task, the process can return to block 804, where the machine-learning model can be further trained using additional training data or otherwise modified to improve accuracy. However, if, at 808, the machine-learning model has an adequate degree of accuracy for the particular task, the process can continue to block 810.

In block 810, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 812, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 814, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

FIG. 9 illustrates an example block diagram 900 including components of an Event Stream Processing (ESP) system, according to certain aspects of the present disclosure. For example, as shown in FIG. 9, the executed operations for each of the one or more services or items are performed with a unique recommendation system 920. The recommendation systems are operating within a heterogeneous mixture of experts model (MoE) to select an optimal combination of recommendation systems that produce recommendations of the one or more services or items to the users based on an indication of relevancies of the metrics to the entity. An event stream processing (ESP) system 910 may include the unique recommendation system 920 for executing the operations of the recommendation system on an Event Stream Processing Engine (ESPE) 930.

FIG. 10 illustrates an example cloud-based recommendation system 1000 including an example set of devices communicating with each other to collect user inputs or historic user inputs from databases, according to certain aspects of the present disclosure. For example, as shown in FIG. 10, the executed operations for each of the one or more services or items are performed with a unique recommendation system 920. The recommendation systems are operating within a heterogeneous mixture of experts model (MoE) to select an optimal combination of recommendation systems that produce recommendations of the one or more services or items to the users based on an indication of relevancies of the metrics to the entity. The unique recommendation system 920 may include a cloud-based recommendation system 1004 to host the MoE and at least one database for the training data set (e.g., Database 1030), at least one database for the validation data set (e.g., Database 1032), and at least one database for the test data set (e.g., Database 1034). The cloud-based recommendation system 1004 may be configured for providing communications (e.g. 1032, 1034) to multiple devices for receiving the user data (e.g., Collected data from a user on a laptop 1010, Collected data from a user on a tablet computer 1012, Collected data from a user on a mobile phone 1014) and providing the recommendations to the users of the multiple devices (Vendor laptop 1080, Vendor laptop 1082).

FIG. 11 illustrates an example table of a training data set, validation data set, and test data set, according to certain aspects of the present disclosure. As shown in Table 1100, the training data set 1102 may include a first set of historic user profiles. The validation data set 1104 may include a second set of historic user profiles. The test data set 1106 may include a third set of historic user profiles. The first set of historic user profiles and the second set of historic user profiles may include one or more user preferences of one or more services or items. The third set of historic user profiles may include user inputs of the one or more services or items that are selected by the entity to display to the users for users to provide to the entity an indication of their one or more user preferences of the one or more services or items. The one or more services or items may include, for example, network or electrical connectivity services, parts and services, extended warranties, accessories, repair or maintenance plans, or a mechanical part or accessory attached to a vehicle. The one or more services or items may relate to a user industry, a vehicle fleet size, a user region, a vehicle model, a vehicle type, a dealer network, or a vehicle trim.

For example, the training data set 1102 may include one or more rows in a table with one or more columns for one or more users 1108 (e.g., User 1, User 2) that relate to the user industry 1110 (e.g., Construction, Rental Cars), the vehicle fleet size 1112 (e.g., Medium, Large), the user region 1114 (e.g., NC, MI), the vehicle model 1116 (e.g., Model 1, Model 2), the vehicle type 1118 (e.g., Truck, SUV), the dealer network, or the vehicle trim 1120 (e.g., 4 door, SE).

The validation data set 1104 may include one or more rows in the table with one or more for one or more users 1108 (e.g., User 3, User 4) that relate to the user industry 1110 (e.g., Telecom, R&D), the vehicle fleet size 1112 (e.g., Medium, Large), the user region 1114 (e.g., WV, SC), the vehicle model 1116 (e.g., Model 3, Model 4), the vehicle type 1118 (e.g., Car, SUV), the dealer network, or the vehicle trim 1120 (e.g., 4 door, LE).

The test data set 1106 may include at least one row in the table with one or more columns for at least one user (e.g., User N) that relates to the user industry 1110 (e.g., Delivery), the vehicle fleet size 1112 (e.g., Medium), the user region 1114 (e.g., IL), the vehicle model 1116 (e.g., Model N), the vehicle type 1118 (e.g., Van), the dealer network, or the vehicle trim 1120 (e.g., XL). The training data set, validation data set, and test data set may also include in the one or more rows in the table a user's selection of the one or more services or items.

For example, the training data set 1102 may include in the one or more rows in the table with one or more columns one or more users 1108 (e.g., User 1, User 2) that selected or did not select Group A, Service 1 1122 (e.g., User 1=Yes or "1", User 2=No or "0"). For example, the validation data set 1104 may include in the one or more rows in the table with one or more columns one or more users 1108 (e.g., User 3, User 4) that selected or did not select Group B, Service 2 1124 (e.g., User 3=No or "0", User 4=Yes or "1"). For example, the test data set 1106 may include in the at least one row in the table with one or more columns one or more users 1108 (e.g., User N) that selected Group N, Service N 1126 (e.g., User N=Yes or "1").

FIG. 12 is an example table for selecting a mixture of recommended models based on a relevancy score for a selected metric or combination of selected metrics, according to certain aspects of the present disclosure. The selection of the recommended model from the plurality of recommended models is based on the relevancy score of the selected metric or the combination of selected metrics as derived from an optimization of the selected metric or an optimization of a combination of a plurality of selected metrics. The selection of the recommended model from the plurality of recommended models is also based on the relevancy score of the selected metric or the combination of selected metrics as derived from a ranking of the weights of the selected metric or the weights of a combination of a plurality of selected metrics.

In FIG. 12, for example, for the selected metric Precision@1 1202 as shown in the table 1200, the selection of the recommended model (e.g., Model 2 1222, Model 3 1224, and Model 4 1226) from the plurality of recommended models (e.g., Model 1 1220, Model 2 1222, Model 3 1224, and Model 4 1226) is based on the relevancy score (e.g., 0.5584 using Model 2 for Group C 1244, 0.8588 using Model 3 for Group B 1246, 0.9432 using Model 4 for Group A 1248), of the selected metric (e.g., Precision@1 1202) as derived from an optimization of the selected metric (e.g., Precision@1 1202) or a ranking of the weights of the selected metric (e.g., Weight of Precision@1 1202=1).

In FIG. 12, for example, for the equally weighted (e.g., 50 percent for each metric) combination of selected metrics Precision@1 1202 and Coverage@1 1208 as shown in the table 1200, the selection of the recommended model (e.g., Model 1 1220 and Model 2 1222) from the plurality of recommended models (e.g., Model 1 1220, Model 2 1222, Model 3 12224, and Model 4 1226) is based on the relevancy score (e.g., 0.737 for precision and 1 for coverage using Model 1 for Group B 1240, 0.9426 for precision and 1 for coverage using Model 2 for Group A 1242), of the combination of selected metrics (e.g., Precision@1 1202 and Coverage@1 1208) as derived from an optimization of a combination of a plurality of selected metrics (e.g., Precision@1 1202 and Coverage@1 1208) or a ranking of the weights of a combination of a plurality of selected metrics (e.g., Weight of Precision@1 1202=0.50 and Weight of Coverage@1 1208=0.50).

FIG. 13 is an example table for outputting generated recommendations to the users for services or items, according to certain aspects of the present disclosure. Output from the selected recommended model is concatenated, filtered, or arranged in a user interface to form the full suite of service recommendations from the system for a given user. Table 1300 shows the output of the one or more generated recommendations in a column 1344 (Extended Service Plan, Telematics Vehicle Location, Data Command & Control Services, Data Fuel Services, Telematics Driver Score) to the users in a column 1340 (e.g., User 1, User 2, User 3, User 4, . . . User N) for each of the one or more services or items. The one or more services or items may include, for example, network or electrical connectivity services, parts and services, extended warranties, accessories, repair or maintenance plans, or a mechanical part or accessory attached to a vehicle. For example, rows 1302, 1304 and 1306 of the table 1300 include the output of three generated recommendations of Extended Service Plan, Telematics Vehicle Location, and Data Command & Control Services to User 1 for each of the one or more services or items (e.g., extended warranties, network or electrical connectivity services, and network or electrical connectivity services). These rows also include the selected recommended model in a column 1342, Model 1, that generates the three recommendations (Extended Service Plan, Telematics Vehicle Location, and Data Command & Control Services) in a column 1344 for User 1 in a column 1340 and the relevancy scores in a column 1346 of 70, 50, and 40, of the selected metric or the combination of selected metrics for the selected recommended model (Model 1).

The foregoing description of certain examples, including illustrated examples, has been presented only for the purpose of illustration and description and is not intended to be exhaustive or to limit the disclosure to the precise forms disclosed. Numerous modifications, adaptations, formats, and uses thereof will be apparent to those skilled in the art without departing from the scope of the disclosure. The examples disclosed herein can be combined or rearranged to yield additional examples.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims. The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments. In situations herein, a "prediction" may be referred to as a "forecast".

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be rearranged. A process is terminated when its operations are completed, but can have additional operations not included in a figure. A process can correspond to a method, a function, a procedure, a subroutine, a subprogram, etc. When a process corresponds to a function, its termination can correspond to a return of the function to the calling function or the main function. The processes may be performed in parallel using a plurality of threads and/or a plurality of worker computing devices.

Systems depicted in some of the figures can be provided in various configurations. In some examples, the systems can be configured as a distributed system where one or more components of the system are distributed across one or more networks in a cloud computing system.

What is claimed is:
1. A system comprising:
a data processor associated with a computing device; and
a non-transitory computer-readable storage medium comprising instructions that are executable by the data processor for causing the computing device to:
generate one or more recommendations for one or more services or items from a plurality of groups of categories to users associated with an entity based on an indication of relevancies of metrics to the entity, wherein for each group of one or more services or items, a respective recommendation system of a plurality of recommendation systems generates the one or more recommendations, and
wherein the plurality of recommendation systems operates in parallel for the generation of the one or more recommendations for the one or more services or items from the plurality of groups;
for each recommendation system within the plurality of recommendations systems, the generation of the one or more recommendations for the one of more services or items from the respective group comprises:
obtain, for the respective recommendation system, a training data set related to a plurality of historic user inputs associated with preferences of one or more services or items from the entity;
train, for the respective recommendation system, a plurality of models using the training data set to generate a plurality of recommended models;
apply, for the respective recommendation system, a validation data set comprising the historic user inputs to generate a plurality of predictions from the plurality of recommended models;
obtain, for the respective recommendation system, a weight of each metric of a plurality of metrics from the entity;
obtain, for the respective recommendation system, user inputs associated with user preferences of the one or more services or items;
determine, for the respective recommendation system, a relevancy score for each metric of the plurality of metrics at least based on the operations of:
selecting each metric in the plurality of metrics, applying at least one prediction and at least one user preference to each selected metric, and applying a weight to the selected metric to generate the relevancy score for the selected metric, the weight representing an indication of importance of the metric to the entity;

select, for the respective recommendation system, a recommended model from the plurality of recommended models based on the relevancy score of the selected metric or a combination of selected metrics; and generate, from the respective recommendation system, one or more recommendations from the selected recommended model; and select an optimal combination of recommendation systems from the plurality of recommendation systems that generates most relevant recommendations based on an indication of relevancies of the metrics to the entity; and output, from the optimal combination of recommendation systems, the most relevant recommendations for the one or more services or items from the plurality of groups of categories.

2. The system of claim 1, the instructions that are executable by the data processor further causes the computing device to apply a test data set comprising the user inputs to the selected recommended model, wherein:

the plurality of models comprise supervised machine learning models, and the non-transitory computer-readable storage medium comprises instructions to:

prior to executing one or more supervised machine learning models, obtaining the validation data set and the test data set for the one or more supervised machine learning models.

3. The system of claim 1, wherein:

the training data set comprises a first set of historic user profiles, the validation data set comprises a second set of historic user profiles, and a test data set comprises a third set of historic user profiles.

4. The system of claim 1, wherein the executed instructions for each group of the one or more services or items are performed with a unique recommendation system.

5. The system of claim 4, wherein the recommendation systems are operating using a heterogeneous mixture of experts model (MoE) to select an optimal combination of recommendation systems that produce recommendations of the one or more services or items to the users based on an indication of relevancies of the metrics to the entity.

6. The system of claim 5, further comprising a cloud-based recommendation system to host the MoE and at least one database for the training data set, the validation data set, and a test data set, the cloud-based recommendation system being configured for providing communications to multiple devices for receiving user data and providing the recommendations to the users of the multiple devices.

7. The system of claim 4, further comprising obtaining user inputs with an event stream processing (ESP) system, wherein the ESP system includes the unique recommendation system for executing the operations of the recommendation system on an event stream processing engine, and wherein the user inputs comprise streaming data received over a period of time.

8. The system of claim 1, wherein the selection of the recommended model from the plurality of recommended models is based on the relevancy score of the selected metric or the combination of selected metrics as derived from an optimization of the selected metric or an optimization of a combination of a plurality of selected metrics.

9. The system of claim 1, wherein the selection of the recommended model from the plurality of recommended models is based on the relevancy score of the selected metric or the combination of selected metrics as derived from a ranking of the weights of the selected metric or the weights of a combination of a plurality of selected metrics.

10. The system of claim 1, wherein the user inputs or the historic user inputs comprise one or more user preferences of the one or more services or items, and wherein the one or more services or items are selected by the entity to display to the users for users to provide to the entity an indication of their one or more user preferences of the one or more services or items.

11. The system of claim 1, wherein the one or more services or items relate to a user industry, a vehicle fleet size, a user region, a vehicle model, a vehicle type, a dealer network, or a vehicle trim.

12. The system of claim 1, wherein the one or more services or items comprise network or electrical connectivity services, parts and services, extended warranties, accessories, repair or maintenance plans, or a mechanical part or accessory attached to a vehicle.

13. The system of claim 1, wherein the plurality of models comprise a random forest, k-nearest neighbors, a matrix factorization, and factorization machines.

14. The system of claim 1, wherein the plurality of metrics comprise precision, recall, F1, coverage, or novelty.

15. The system of claim 1, wherein the combination of the selected metrics comprises a weighted combination of the selected metrics that is computed using $$\underset{r \in R}{\operatorname{argmax}} \sum_{i=1}^{n} \omega_i \phi_i(\hat{y}_r),$$

where r represents the selected model from a set of recommendation systems, R represents the set of recommendation systems for a group of one or more services or items, $\omega_i$ represents weights of a corresponding plurality of metrics, $\phi_i$ represents the plurality of metrics, and $\hat{y}_r$ represents the corresponding selected recommendations.

16. A computer-implemented method comprising:

generating one or more recommendations for one or more services or items from a plurality of groups of categories to users associated with an entity based on an indication of relevancies of metrics to the entity, wherein for each group of one or more services or items, a respective recommendation system of a plurality of recommendation systems generates the one or more recommendations, and wherein the plurality of recommendation systems operates in parallel for the generation of the one or more recommendations for the one or more services or items from the plurality of groups;

for each recommendation system within the plurality of recommendations systems, the generation of the one or more recommendations for the one of more services or items from the respective group comprises:

obtaining, for the respective recommendation system, a training data set related to a plurality of historic user inputs associated with preferences of one or more services or items from the entity;

training, for the respective recommendation system, a plurality of models using the training data set to generate a plurality of recommended models;

applying, for the respective recommendation system, a validation data set comprising the historic user inputs to generate a plurality of predictions from the plurality of recommended models;

obtaining, for the respective recommendation system, a weight of each metric of a plurality of metrics from the entity;

obtaining, for the respective recommendation system, user inputs associated with user preferences of the one or more services or items;

determining, for the respective recommendation system, a relevancy score for each metric of the plurality of metrics at least based on the operations of:
- selecting each metric in the plurality of metrics,
- applying at least one prediction and at least one user preference to each selected metric, and
- applying a weight to the selected metric to generate the relevancy score for the selected metric, the weight representing an indication of importance of the metric to the entity;

selecting, for the respective recommendation system, a recommended model from the plurality of recommended models based on the relevancy score of the selected metric or a combination of selected metrics; and generating, from the respective recommendation system, one or more recommendations from the selected recommended model; and selecting an optimal combination of recommendation systems from the plurality of recommendation systems that generates most relevant recommendations based on an indication of relevancies of the metrics to the entity; and outputting, from the optimal combination of recommendation systems, the most relevant recommendations for the one or more services or items from the plurality of groups of categories.

17. The computer-implemented method of claim 16, further comprising applying a test data set comprising the user inputs to the selected recommended model, wherein:
the plurality of models comprise supervised machine learning models, and prior to executing one or more supervised machine learning models, obtaining the validation data set and the test data set for the one or more supervised machine learning models.

18. The computer-implemented method of claim 16, wherein:
the training data set comprises a first set of historic user profiles,
the validation data set comprises a second set of historic user profiles, and
a test data set comprises a third set of historic user profiles.

19. The computer-implemented method of claim 16, wherein each group of the one or more services or items are associated with a unique recommendation system.

20. The computer-implemented method of claim 19, wherein the recommendation systems are operating using a heterogeneous mixture of experts model (MoE) to select an optimal combination of recommendation systems that produce recommendations of the one or more services or items to the users based on an indication of relevancies of the metrics to the entity.

21. The computer-implemented method of claim 20, further comprising a cloud-based recommendation system to host the MoE and at least one database for the training data set, the validation data set, and a test data set, the cloud-based recommendation system being configured for providing communications to multiple devices for receiving user data and providing the recommendations to the users of the multiple devices.

22. The computer-implemented method of claim 19, further comprising obtaining user inputs with an event stream processing (ESP) system,
wherein the ESP system includes the unique recommendation system for operating the recommendation system on an event stream processing engine, and
wherein the user inputs comprise streaming data received over a period of time.

23. The computer-implemented method of claim 16, wherein the selection of the recommended model from the plurality of recommended models is based on the relevancy score of the selected metric or the combination of selected metrics as derived from an optimization of the selected metric or an optimization of a combination of a plurality of selected metrics.

24. The computer-implemented method of claim 16, wherein the selection of the recommended model from the plurality of recommended models is based on the relevancy score of the selected metric or the combination of selected metrics as derived from a ranking of the weights of the selected metric or the weights of a combination of a plurality of selected metrics.

25. The computer-implemented method of claim 16, wherein the user inputs or the historic user inputs comprise one or more user preferences of the one or more services or items, and
wherein the one or more services or items are selected by the entity to display to the users for users to provide to the entity an indication of their one or more user preferences of the one or more services or items.

26. A non-transitory computer-readable storage medium comprising instructions that are executable by a data processor for causing a computing device to:
generate one or more recommendations for one or more services or items from a plurality of groups of categories to users associated with an entity based on an indication of relevancies of metrics to the entity,
wherein for each group of one or more services or items, a respective recommendation system of a plurality of recommendation systems generates the one or more recommendations, and
wherein the plurality of recommendation systems operates in parallel for the generation of the one or more recommendations for the one or more services or items from the plurality of groups;
for each recommendation system within the plurality of recommendations systems, the generation of the one or more recommendations for the one of more services or items from the respective group comprises:
obtain, for the respective recommendation system, a training data set related to a plurality of historic user inputs associated with preferences of one or more services or items from the entity;
train, for the respective recommendation system, a plurality of models using the training data set to generate a plurality of recommended models;
apply, for the respective recommendation system, a validation data set comprising the historic user inputs to generate a plurality of predictions from the plurality of recommended models;

obtain, for the respective recommendation system, a weight of each metric of a plurality of metrics from the entity;
obtain, for the respective recommendation system, user inputs associated with user preferences of the one or more services or items;
determine, for the respective recommendation system, a relevancy score for each metric of the plurality of metrics at least based on the operations of:
  selecting each metric in the plurality of metrics,
  applying at least one prediction and at least one user preference to each selected metric, and
  applying a weight to the selected metric to generate the relevancy score for the selected metric, the weight representing an indication of importance of the metric to the entity;
select, for the respective recommendation system, a recommended model from the plurality of recommended models based on the relevancy score of the selected metric or a combination of selected metrics; and
generate, from the respective recommendation system, one or more recommendations from the selected recommended model; and
select an optimal combination of recommendation systems from the plurality of recommendation systems that generates most relevant recommendations based on an indication of relevancies of the metrics to the entity; and
output, from the optimal combination of recommendation systems, the most relevant recommendations for the one or more services or items from the plurality of groups of categories.

27. The non-transitory computer-readable storage medium of claim 26, the instructions that are executable by the data processor further causing the computing device to apply a test data set comprising the user inputs to the selected recommended model, wherein:
  the plurality of models comprise supervised machine learning models, and
  the non-transitory computer-readable storage medium comprises instructions to:
    prior to executing one or more supervised machine learning models, obtaining the validation data set and the test data set for the one or more supervised machine learning models.

28. The non-transitory computer-readable storage medium of claim 26, wherein:
  the training data set comprises a first set of historic user profiles,
  the validation data set comprises a second set of historic user profiles, and
  a test data set comprises a third set of historic user profiles.

29. The non-transitory computer-readable storage medium of claim 26, wherein the executed instructions for each group of the one or more services or items are performed with a unique recommendation system.

30. The non-transitory computer-readable storage medium of claim 29, wherein the recommendation systems are operating using a heterogeneous mixture of experts model (MoE) to select an optimal combination of recommendation systems that produce recommendations of the one or more services or items to the users based on an indication of relevancies of the metrics to the entity.

* * * * *

UNITED STATES PATENT AND TRADEMARK OFFICE
CERTIFICATE OF CORRECTION

PATENT NO. : 11,842,379 B2
APPLICATION NO. : 18/169592
DATED : December 12, 2023
INVENTOR(S) : Jonathan Lee Walker et al.

It is certified that error appears in the above-identified patent and that said Letters Patent is hereby corrected as shown below:

In the Specification

Column 13, Line 9:
Delete the phrase "Test Data 382) to the selected recommended model 384. For" and replace with
--Test Data 382) to the selected recommended model. For--.

Column 16, Line 13:
Delete the phrase "mendations 390 (e.g., Recommendations(s) 390, Recommen-" and replace with
--mendations (e.g., Recommendations(s) 390, Recommen- --.

Column 25, Line 46:
Delete the phrase "rows in the table with one or more for one or more users" and replace with --rows
in the table with one or more columns for one or more users--.

In the Drawings

Please replace FIGS. 2A, 2C, 4A, 11, 12 with FIGS. 2A, 2C, 4A, 11, 12 as shown on the attached
pages.

Signed and Sealed this
Twelfth Day of March, 2024

Katherine Kelly Vidal
*Director of the United States Patent and Trademark Office*

| User Name | Industry | Fleet Size | Region | Model | Type | Trim | Group A Service 1? (Yes=1)(No=0) | Group B Service 1? (Yes=1)(No=0) | ... | Group N Service 1? (Yes=1)(No=0) | Group A Service 2? (Yes=1)(No=0) | Group B Service 2? (Yes=1)(No=0) | ... | Group N Service 2? (Yes=1)(No=0) | ... | Group A Service N? (Yes=1)(No=0) | Group B Service N? (Yes=1)(No=0) | ... | Group N Service N? (Yes=1)(No=0) |
|---|---|---|---|---|---|---|---|---|---|---|---|---|---|---|---|---|---|---|---|
| User 1 | Construction | Medium | NC | Model 1 | Truck | 4 door | 1 | 0 | ... | 0 | 0 | 1 | ... | 1 | ...2 | 1 | 0 | ...3 | 1 |
| User 2 | Rental Cars | Large | MI | Model 2 | SUV | SE | 0 | 1 | ... | 1 | 1 | 0 | ... | 0 | ... | 1 | 0 | ... | 1 |
| User 3 | Telecom | Medium | WV | Model 3 | Car | 4 door | 1 | 0 | ... | 1 | 1 | 0 | ... | 1 | ... | 1 | 0 | ... | 1 |
| User 4 | R&D | Large | SC | Model 4 | SUV | LE | 0 | 1 | ... | 1 | 0 | 1 | ... | 1 | ... | 0 | 1 | ... | 1 |
| --- | --- | --- | --- | --- | --- | --- | --- | --- | --- | --- | --- | --- | --- | --- | --- | --- | --- | --- | --- |
| User N | Delivery | Medium | IL | Model N | Van | XL | 1 | 0 | ... | 1 | 1 | 1 | ... | 0 | ... | 1 | 0 | ... | 1 |

FIG. 11

|  | Model 1 ||| Model 2 ||| Model 3 ||| Model 4 |||
| --- | --- | --- | --- | --- | --- | --- | --- | --- | --- | --- | --- | --- |
|  | Group A | Group B | Group C | Group A | Group B | Group C | Group A | Group B | Group C | Group A | Group B | Group C |
| Precision@1 | 0.9362 | 0.737 | 0.5225 | 0.9426 | 0.76 | 0.5584 | 0.939 | 0.8588 | 0.551 | 0.9432 | 0.7636 | 0.5532 |
| Recall@1 | 0.9282 | 0.6687 | 0.3043 | 0.9345 | 0.6896 | 0.3252 | 0.9294 | 0.7846 | 0.3224 | 0.9351 | 0.6928 | 0.3222 |
| F1@1 | 0.9322 | 0.7012 | 0.3846 | 0.9385 | 0.7231 | 0.4111 | 0.9341 | 0.82 | 0.4079 | 0.9391 | 0.7265 | 0.4072 |
| Coverage | 1 | 1 | 0.6706 | 1 | 0.9167 | 0.6951 | 0.6667 | 0.3333 | 0.1975 | 0.6667 | 0.3333 | 0.2824 |
| Novelty | 0.0927 | 0.561 | 0.8126 | 0.0829 | 0.5555 | 0.815 | 0.0589 | 0.5436 | 0.7803 | 0.0676 | 0.5335 | 0.7991 |

FIG. 12